(12) United States Patent
Obata et al.

(10) Patent No.: US 6,275,459 B1
(45) Date of Patent: Aug. 14, 2001

(54) DISC APPARATUS

(75) Inventors: Manabu Obata; Masakazu Usui, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/191,952

(22) Filed: Nov. 13, 1998

(30) Foreign Application Priority Data

Nov. 17, 1997 (JP) ................................................. 9-315202

(51) Int. Cl.[7] ............................ G11B 17/04; G11B 33/02
(52) U.S. Cl. .......................................................... 369/75.2
(58) Field of Search ........................... 369/75.2, 13, 77.1, 369/77.2; 360/99.02, 99.06

(56) References Cited

U.S. PATENT DOCUMENTS

| | | | |
|---|---|---|---|
| 5,123,004 | * 6/1992 | Arai | 369/75.2 |
| 5,258,965 | * 11/1993 | Sekine et al. | 369/13 |
| 5,452,271 | * 9/1995 | Ohmori et al. | 369/13 |
| 5,995,468 | * 11/1999 | Furukawa | 369/77.1 |
| 6,002,658 | * 12/1999 | Aso et al. | 369/75.1 |
| 6,016,299 | * 1/2000 | Ishige | 369/75.2 |

FOREIGN PATENT DOCUMENTS

20368 * 1/1994 (JP).

* cited by examiner

Primary Examiner—David Davis
Assistant Examiner—Angel Castro
(74) Attorney, Agent, or Firm—Jay H. Maioli

(57) ABSTRACT

A disc apparatus which can easily perform emergency-ejection operation by using two motors in a cartridge retraction device and a disc loading device. The disc apparatus includes two clutches provided in the middle of gear trains of the two motors which actuate the cartridge retraction device and the disc loading device, respectively, an emergency ejection-operating lever for switching both of the clutches from an engaged to a disengaged state, and an ejecting spring for ejecting a cartridge when both of the clutches are switched from the engaged to the disengaged state.

6 Claims, 41 Drawing Sheets ically a cartridge
DISC APPARATUS

BACKGROUND OF THE INVENTION

1. Field of the Invention

The present invention relates to a disc apparatus suitably applied to an optical disc apparatus and the like for loading an optical disc, such as a CD-ROM, by a cartridge to record and/or reproduce information on and/or from the optical disc. More particularly, the present invention relates to a disc apparatus in which the cartridge is automatically retracted.

2. Description of the Related Art

Hitherto, an optical disc apparatus has been known in which the cartridge is inserted into a cartridge insertion guide, and the cartridge is automatically retracted to a retraction end position and then, a mechanical deck equipped with a spindle motor, a disc table, and so forth, is moved upward so as to load the optical disc on a disc table.

In the conventional optical disc apparatus of this type, a cartridge retracting motor provided on a cartridge retraction device and a disc loading motor provided on a disc loading device are employed as a driving source. For this reason, it is difficult to manually eject the cartridge out of the optical disc apparatus when an emergency occurs such as that power is suddenly shut down due to a power failure or the like after loading a disc on a disc table.

SUMMARY OF THE INVENTION

It is an object of the present invention to provide a disc apparatus which can manually eject a cartridge out of the apparatus when an emergency, such as a power failure, occurs after a disc-shaped recording medium is loaded on a disc table.

It is another object of the present invention to provide a disc apparatus which can locate the cartridge with high accuracy, and ensure dust-resistance, lightness, and rigidity.

According to an aspect of the invention, there is provided a disc apparatus for loading a cartridge containing therein a disc-shaped recording medium to perform recording and/or reproducing information on and/or from the disc-shaped recording medium, the apparatus including: guide means into which the cartridge is inserted; cartridge retracting means including a first motor for retracting the cartridge inserted into the guide means; disc loading means including a second motor for inserting a disc table into the cartridge retracted by the cartridge retracting means and loading the disc-shaped recording medium on the disc table; first and second clutch means provided in the middle of driving paths of the first and second motor, respectively; operation means for switching both of the first and second clutch means to a disengaged state; and ejection means for ejecting the cartridge to the outside of the guide means when both of the first and second clutch means are switched to a disengaged state.

With the above arrangement, if the emergency ejection-operating means is operated when an emergency occurs, such as power failure, after loading the disc-shaped recording medium on the disc table, two clutches provided in the middle of the driving paths of the two motors, respectively, are switched to the disengaged state, so that the cartridge can be automatically ejected by the ejection means.

According to another aspect of the invention, there is provided a disc apparatus, including: guide means into which the cartridge is inserted; cartridge retracting means for retracting the cartridge inserted into the guide means to a retraction end position of the guide means; a plurality of positioning pins inserted into the guide means from below after the cartridge has been retracted by the cartridge retracting means; cartridge presser means for pressing the cartridge from above the guide means to position the cartridge on the positioning pins after the cartridge has been retracted by the cartridge retracting means; and a driving mechanism for moving the cartridge presser means up and down parallel to the guide means.

With the above arrangement, the cartridge presser member provided above a cartridge insertion guide can be moved up and down in a parallel motion by a cartridge presser member-actuating mechanism. The cartridge presser member-actuating mechanism is intended to actuate a plurality of cam slots and cam follower pins by a slide plate, and is arranged on both sides of the cartridge insertion guide.

According to a further aspect of the invention, there is provided a disc apparatus, including: a dust-preventing resin chassis formed of synthetic resin and having substantially a uniform thickness; and a cartridge insertion guide formed of a sheet metal, the cartridge insertion guide being detachably mounted on the inside of the resin chassis.

With the above arrangement, the rigidity of the resin chassis can be ensured by reinforcing the inside of a dust-preventing resin chassis, which is formed to have a substantially uniform thin-walled structure, with the cartridge insertion guide formed of a sheet metal.

DESCRIPTION OF THE PREFERRED EMBODIMENTS

Figure 1:
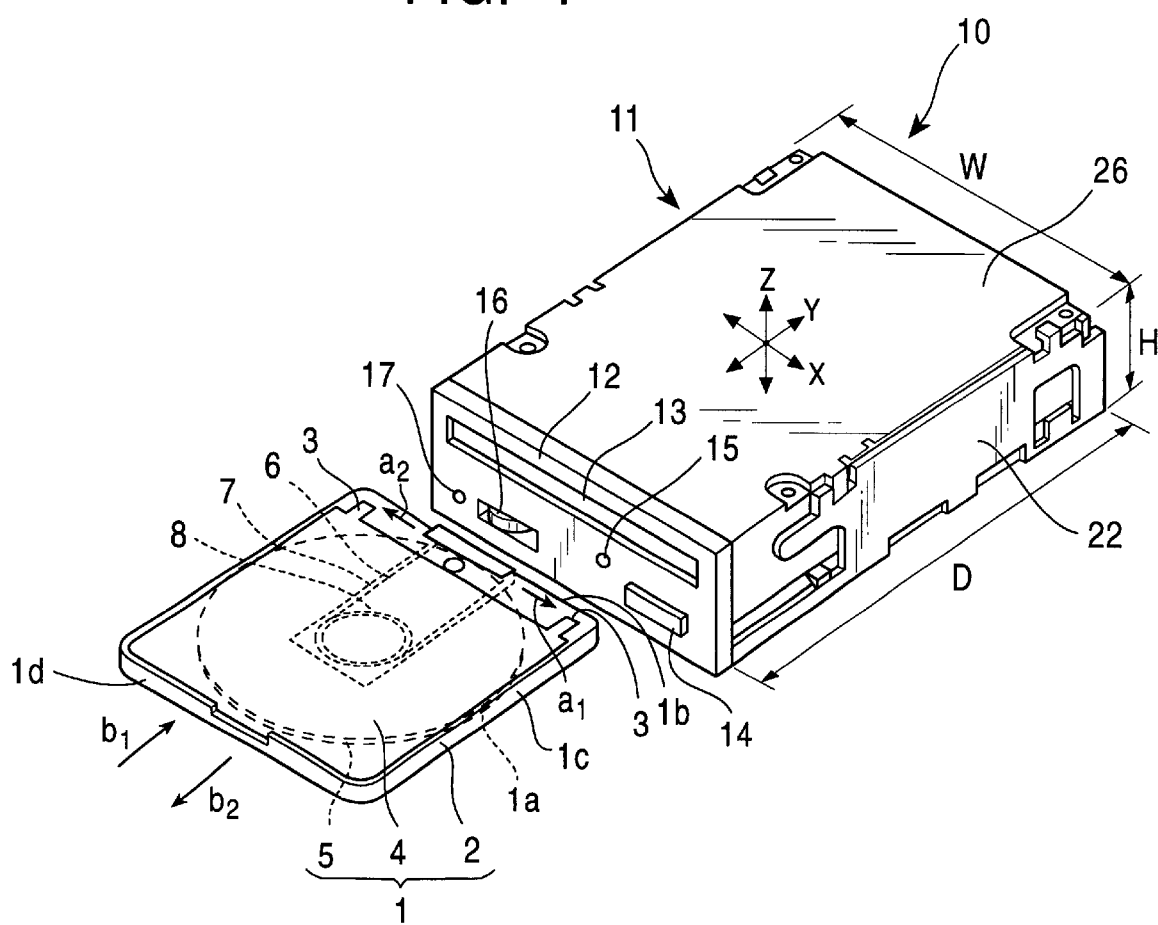
FIG. 1 is an external perspective view illustrating an embodiment of a cartridge and an optical disc apparatus.
Figure 2:
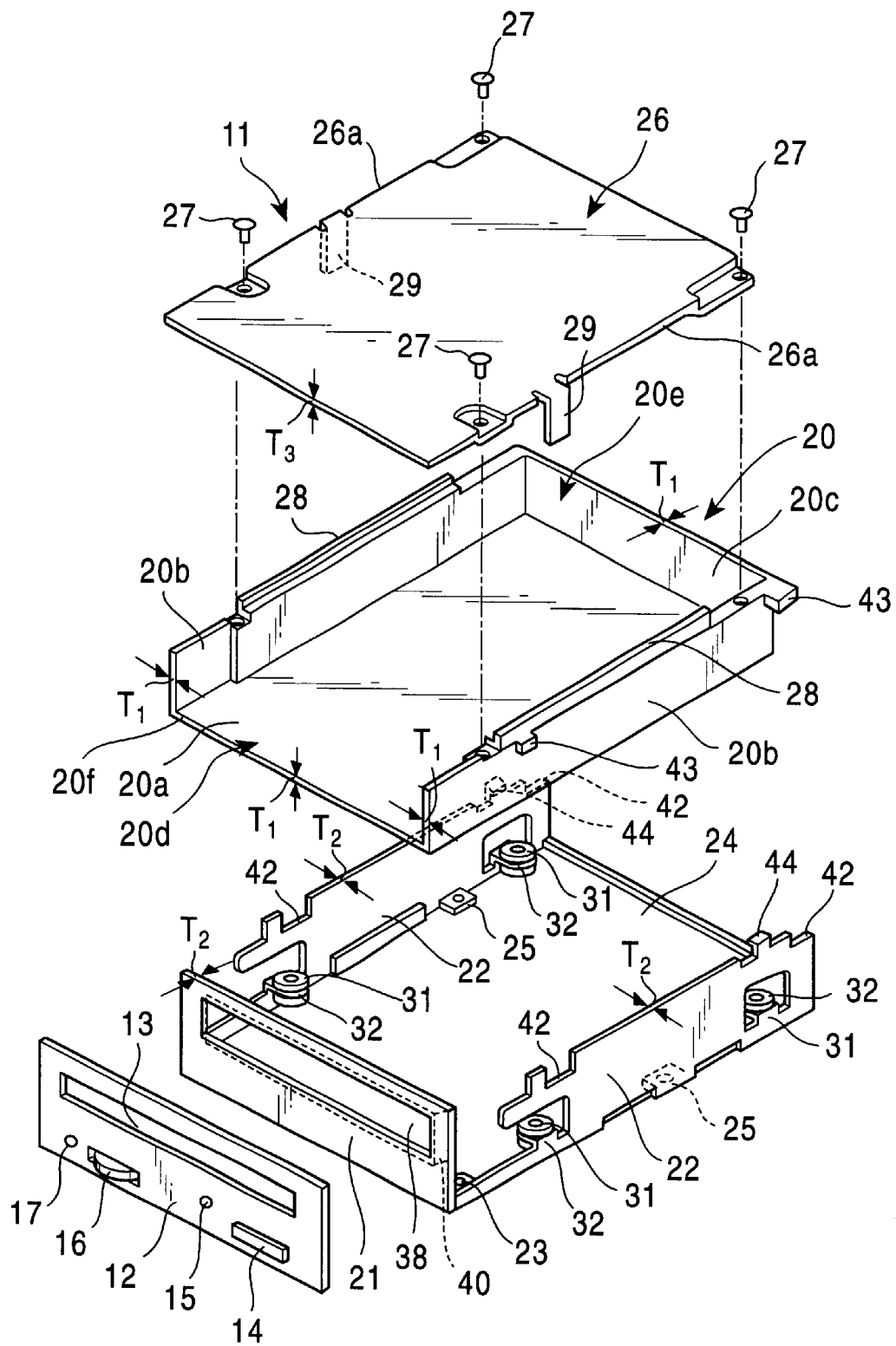
FIG. 2 is an exploded perspective view illustrating a structure of a chassis of the optical disc apparatus.

The preferred embodiments of a disc apparatus according to the present invention will now be described with reference to the accompanying drawings. The disc apparatus in the following embodiments is an optical disc apparatus for recording and/or reproducing information on and/or from an optical disc, such as a CD and a CD-ROM.

(1) Cartridge and an Optical Disc Apparatus

A cartridge 1 and an optical disc apparatus 10 will be briefly described with reference to FIG. 1.

The cartridge 1 consists of a substantially square and flat main body 2 formed of synthetic resin, and a top cover 4 mounted on the top of the main body 2 so as to be opened and closed vertically about hinges 3. An optical disc 5, such as a CD and a CD-ROM, is replaceably accommodated in the cartridge 1 (the optical disc 5 can be freely replaced by opening the top cover 4). A long bottom opening 6 extends from the center of a bottom 1a of the cartridge 1 to the center of a front end 1b, and a shutter 7 for opening and closing the bottom opening 6 is provided so as to be slidable along the front end 1b in the directions of the arrows $a_1$, $a_2$. The shutter 7 is slidingly biased in the direction of the arrow $a_2$ by a shutter spring (not shown) contained therein to a position to close the bottom opening 6. A chucking pulley 8 is attached on the inner surface of the center of the top cover 4.

A main body 11 of the optical disc apparatus 10 is formed in a flat rectangular shape ready for a 5-inch form factor, and has a width W of about 146.0 mm, a height H of about 41.4 mm, and a depth D of about 203.00 mm. A laterally long-shaped cartridge insertion slot 13 is formed in the upper part of a front panel 12 of the main body 11 so that the cartridge 1 can be loaded and ejected therefrom in the directions shown by the arrows $b_1$ and $b_2$, respectively. An eject button 14, an emergency-ejection operating hole 15, a volume knob 16, and an earphone jack 17 are provided at the lower part of the cartridge insertion opening 13.

(2) Chassis

A chassis constituting the main body 11 will now be described with reference to FIGS. 2 to 11. First, a dust-preventing resin chassis 20 formed of synthetic resin is employed in the main body 11. The resin chassis 20 is formed into the shape of a shallow box by a bottom plate 20a of a thin-walled structure having substantially a uniform thickness $T_1$ of about 1.4 mm, a pair of side plates 20b, and a rear plate 20c, and front and top surfaces thereof are opened by a front opening 20d and a top opening 20e. A front frame 21 formed by a sheet metal having a thickness $T_2$ of about 1.2 mm, and a pair of side frames 22 are detachably assembled in substantially a U-shape in plan view by a plurality of set screws 23, and a bottom cover 24 formed of a sheet metal is horizontally detachably assembled by a plurality of set screws 25 on the bottom of the front frame 21 and the side frames 22. A top cover 26 formed of a sheet metal is horizontally detachably assembled by a plurality of set screws 27 on the top of the resin chassis 20, and the top of the resin chassis 20 is closed by the top cover 26. The thickness $T_3$ of the bottom and top covers 24 and 26 is about 0.8 mm or less.

An injection molding of the thus constructed resin chassis 20 using synthetic resin certainly causes a molding distortion such that particularly long-span side plates 20b flex inward. Thus, four corners of the top cover 26 are secured to the upper end surfaces of the side plates 20b of the resin chassis 20 by four set screws 27, and a pair of flexure-preventing ribs 28 integrally formed along the upper edges of the side plates 20b are brought into abutment with the both side edges 26a of the top cover 26 from the both sides, whereby the inward flexure of the side plates 20b are adjusted to precisely define the internal effective size (especially, the width) of the resin chassis 20. A pair of locking tabs 29 formed by bending the top cover 26 vertically downward at its both side-edges 26a are inserted into a pair of insertion holes 30 (see FIG. 5) formed in the side plates 20b, respectively. The resin chassis 20 of which the front and top surfaces are opened can be easily molded by a simple die of a normal two-split structure.

The resin chassis 20 of which the top is sealed by the top cover 26 is inserted from above between the side frames 22 to be placed in a horizontal position, and is elastically supported between the side frames 22 by four insulators 31. In this case, the four insulators 31 each formed by an elastic member, such as rubber, into a cylindrical shape are fitted to four insulator mounting tabs 32 each having substantially a C-shape formed by bending horizontally inward the side frames 22 at their respective front and rear positions by means of annular grooves 33 formed in the outer periphery of the insulators 31, four insulator mounting bosses 34 integrally formed with the lower surface of the bottom plate 20a are lightly pressed into the centers of the insulators 31 from above, and four flange set screws 35 are screwed into the insulator mounting bosses 34 from below to secure the resin chassis 20, whereby the insulators 31 are provided between the insulator mounting tabs 32 and the bottom plate 20a of the resin chassis 20. A vibration-preventing space 36 is secured on the outer periphery of the resin chassis 30 and between the front frame 21 and the side frames 22.

The front panel 12 formed of synthetic resin is detachably mounted parallel to the front surface of the front frame 21 by means of locking pawls (not shown), and a cartridge insertion opening 38 formed in the front frame 21 is overlapped inside the cartridge insertion slot 13 of the front panel 12. The cartridge insertion slot 13 is opened and closed from inside by an inner cover 40 that is provided inside the front frame 21 so as to be rotatable about a pair of supporting pins 39 in the direction of the arrows $b_1$, $b_2$. A U-shaped front end surface 20f of the resin chassis 20 is lightly pressed into attachment to a dust-preventing sponge member 41 bonded to the outer peripheral portion of the inner cover 40 at the rear of the front frame 21, thereby ensuring dust-resistance inside the resin chassis 20.

When the thus constructed main body 11 is mounted inside a computer or the like, the side frames 22 are secured to a chassis of the computer by screws and the front panel 12 is exposed to the outside of the front panel of the computer. The dust-preventing resin chassis 20 constructed into a substantially uniform thin-walled structure is employed in the main body 11, whereby the main body 11 can be constructed to have compact external dimensions ready for a 5-inch form factor while ensuring high dust-resistance inside the main body 11 and enlarging the internal effective size. In addition, the inward flexure of the side plates 20b is adjusted by the top cover 26, so that the internal effective size of the resin chassis 20 is precisely defined.

Incidentally, a cartridge insertion guide, a cartridge retraction device, a mechanical deck and its actuating device, a cartridge positioning device, an emergency ejection device, a head transfer device, a tangential skew adjuster, and a thrust bearing device described below are all incorporated into the resin chassis 20. The resin chassis 20 is elastically supported by the four insulators 31 with respect to the side frames 22, whereby a high degree of vibration-resistance can be ensured.

That is, by incorporating all of the above devices into the resin chassis 20, the resin chassis 20 becomes a heavy component. Since an inertial force can be increased with an increase in weight of the resin chassis 20, unlike an optical disc device in which only a lightweight component, such as a head transfer device 170 described below, is elastically supported by the insulators 31, vibrations in the X-, Y-, and Z-directions shown in FIG. 1 of the resin chassis 20 caused by an external vibration or impact imparted thereto can be remarkably reduced, so that a highly vibration-resistant optical disc apparatus can be realized.

In this case, however, stoppers for preventing the breakage of the insulators 31 by preventing the resin chassis 20 from being vibrated in a fixed amount or more in the X-, Y- and Z-directions by external vibration or impact are formed on the side frames 22.

That is, the side frames 22 serve as the stoppers with respect to the vibration of the resin chassis 20 in a fixed amount or more in the X-direction. Four projections 43 formed on the front and rear positions of the upper edges of the side plates 20b are loosely fitted into four cutouts 42 formed in the front and rear positions of the upper edges of the side frames 22, and these cutouts 42 serve as stoppers with respect to the vibrations of the resin chassis 20 in a fixed amount or more in the X- and Y-directions. In addition, a pair of stopper tabs 44 formed by bending inward the side frames 22 in substantially an L-shape at their upper edges are overlapped on the top of the top cover 26, and a stopper screw 45 screwed into the front frame 21 is arranged on the top of the front end of the bottom plate 20 so as to serve as a strong stopper with respect to the vibrations of the resin chassis 20 in the fixed amount or more, particularly in the Z-direction.

(3) Cartridge Insertion Guide

A cartridge insertion guide 50 will now be described with reference to FIGS. 5, 7, 9, 10, and 14. The cartridge insertion guide 50 is formed of a relatively thick sheet metal, and consists of a horizontal main body 51 and a pair of parallel guide tabs 52 formed by bending the main body 51 vertically upward at its both side edges. A pair of symmetrical entrance guides 53 each having substantially a U-shape are integrally formed with front ends of the guide tabs 52 (on the side of the front panel 12). The cartridge insertion guide 50 is also formed by a chassis reinforcing member of high rigidity.

The cartridge insertion guide 50 of high rigidity is inserted into the resin chassis 20 in a horizontal position, and is detachably horizontally secured by screws at the same height as that of the cartridge insertion slot 13 in the resin chassis 20. That is, four mounting tabs 54 formed by bending the cartridge insertion guide 50 downward in substantially a Z-shape at its four corners are detachably secured by four set screws 56 on four mounting pads 55 that are integrally formed with inner corner portions of the bottom plate 20a and side plates 20b of the resin chassis 20.

Therefore, the cartridge insertion guide 50 is used also as a reinforcing member for the resin chassis 20, so that the rigidity of the resin chassis 20, such as plane strength and torsional rigidity can be ensured. In other words, the dust-resistance inside the main body 11 is ensured by employing the resin chassis 20 in the main body 11, and the internal effective size of the resin chassis 20 is enlarged by forming the resin chassis 20 in substantially a uniform thin-walled structure while reducing the external dimensions of the main body 11. The reduction in rigidity of the resin chassis 20 due to its substantially uniform thin-walled structure is reinforced by the cartridge insertion guide 50 to ensure even the rigidity of the resin chassis 20, thereby realizing a high-accuracy optical disc apparatus 10 in which all of the devices incorporated into the resin chassis 20 can be operated with high accuracy.

A shutter actuating lever 57 that is used also as an ejection lever is mounted on one side part of the rear end of the main body 51 of the cartridge insertion guide 50 so as to be rotatable about a supporting pin 58 in the direction of the arrows $c_1$, $c_2$. A shutter-actuating roller 59 is rotatably attached to the distal end of the shutter actuating lever 57, and the shutter actuating lever 57 is rotationally biased in the direction of the arrow $c_2$ by an ejecting spring 60 consisting of a torsion coil spring provided around the support pin 58, and is brought into abutment with the stopper 62 to be stopped. In addition, an opening 61 for inserting therein a disc table and an optical pickup is formed in substantially the center of the main body 51.

(4) Cartridge Retraction Device

A cartridge retraction device 65 will now be described with reference to FIGS. 5, 7, 8, 12, and 13.

The cartridge retraction device 65 is mounted on the other side of the rear end of the main body 51 of the cartridge insertion guide 50, i.e., the opposite side of the shutter actuating lever 57. The cartridge retraction device 65 includes a hook 67 engaged with retracting recesses 66 formed in both side parts of the front end 1b side of the cartridge 1, a slider 68 for actuating the hook 67, a rotary lever 69, and a cartridge retracting motor 70.

The slider 68 formed of synthetic resin is engaged with a plurality of guide pins 71a provided on the guide main body 51 via a guide slot 71b. The slider 68 is constructed so as to be slidable on the main body 51 in the directions of the arrows $b_1$, $b_2$. Mounted on the main body 51 are a gear train 75 including a worm gear 74 consisting of a worm 72 and a worm wheel 73 actuated by the cartridge retracting motor 70, and a pinion 76 of an output end of the gear train 75. A rack 77 meshed with the pinion 76 is formed on one side edge of the slider 68.

A rotary lever 69 is rotatably mounted about a supporting pin 78 attached on the main body 51 in the directions of the arrows $d_1$, $d_2$, and is rotationally biased in the direction of the arrow $d_2$ by an ejecting spring 80 consisting of a tension spring that is stretched between spring retainers 79. An interlocking projection 81 integrally formed on the slider 68 is loosely fitted into an interlocking hole 82 formed in the distal end side of the rotary lever 69. An interlocking link 84 is rotatably attached to the distal end of the rotary lever 69 via a supporting pin 83, and the hook 67 is rotatably attached to the distal end of the interlocking link 84 via a supporting pin 85. The lower end of the supporting pin 85 is slidably loosely fitted into a guide slot 86 formed in the main body 51 in the direction of the arrows $b_1$, $b_2$. The hook 67 is rotatable about the supporting pin 85 in the directions of the arrows $e_1$, $e_2$, and is slidable in the direction of the arrows $b_1$, $b_2$. In addition, the hook 67 is rotationally biased about the supporting pin 85 in the direction of the arrow $e_2$ by a hook spring 87 consisting of a tension spring stretched between the hook 67 and the interlocking link 84.

Inserting and retracting operations of the cartridge 1 into the cartridge insertion guide 50 will now be described.

Figure 5:
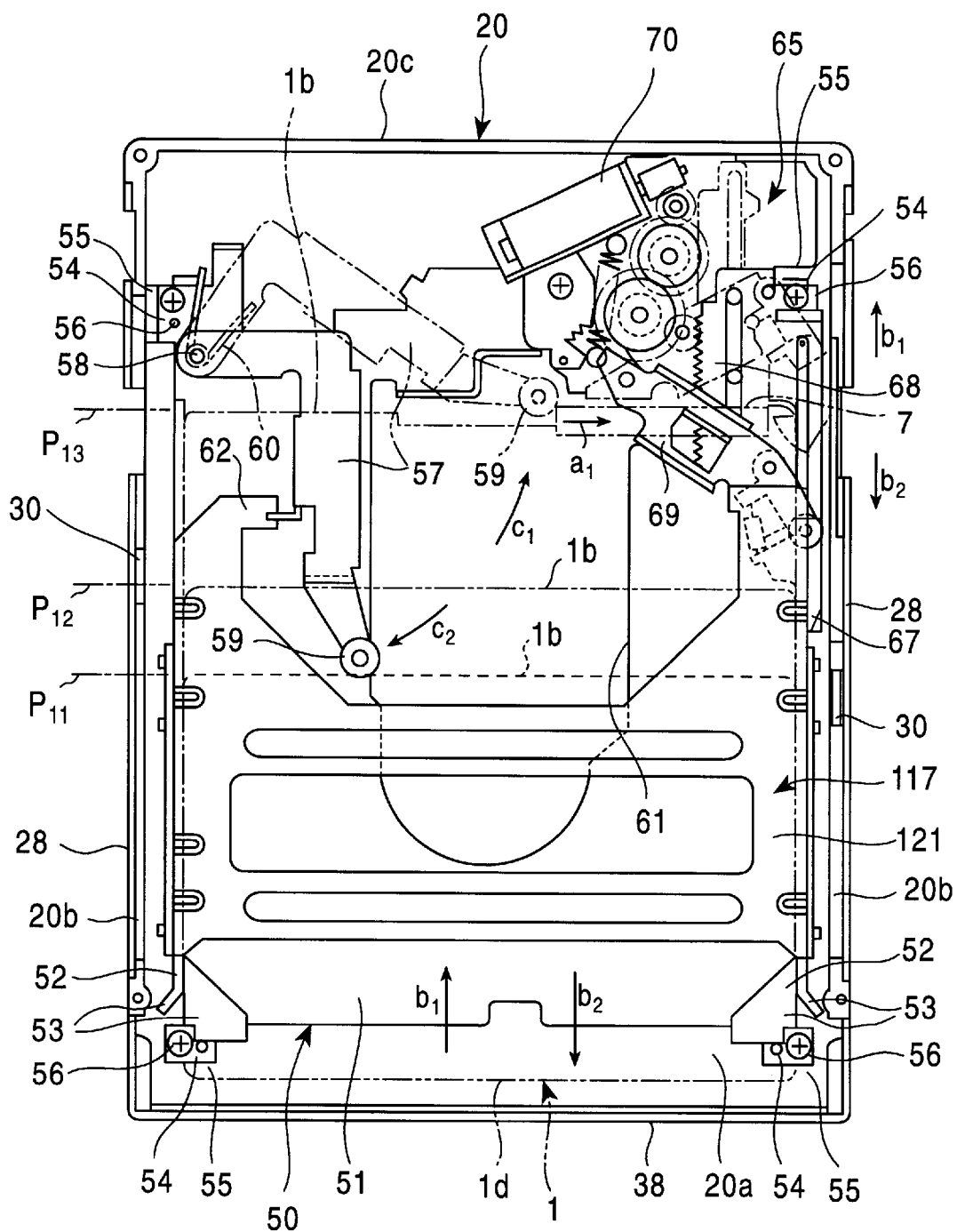
FIG. 5 is a plan view showing a state in which a top cover of the optical disc apparatus is removed to show a cartridge insertion guide.

First, before starting insertion of the cartridge 1, the shutter actuating lever 57 is rotationally returned in the direction of the arrow $c_2$ to the position shown by the solid line in FIG. 5 by the ejecting spring 60. In addition, as shown by the solid line in FIG. 5 and shown in FIG. 12, the slider 68 and the rotary lever 69 are slidingly returned and rotationally returned in the directions of the arrows $b_2$, $d_2$, respectively, and the hook 67 is slidingly returned in the direction of the arrow $b_2$.

Figure 3:
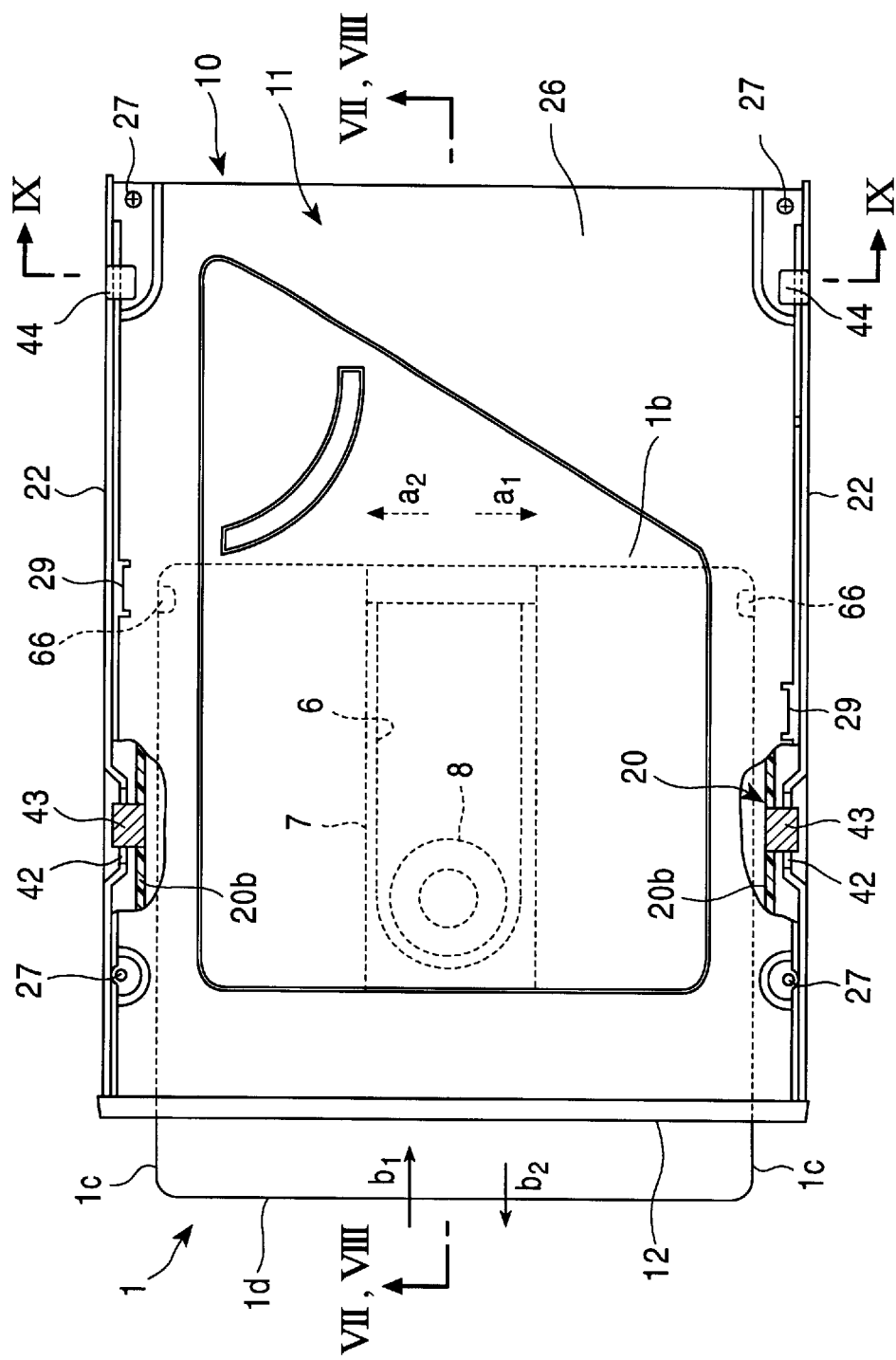
FIG. 3 is a partially cutaway plan view of the optical disc apparatus.
Figure 4:
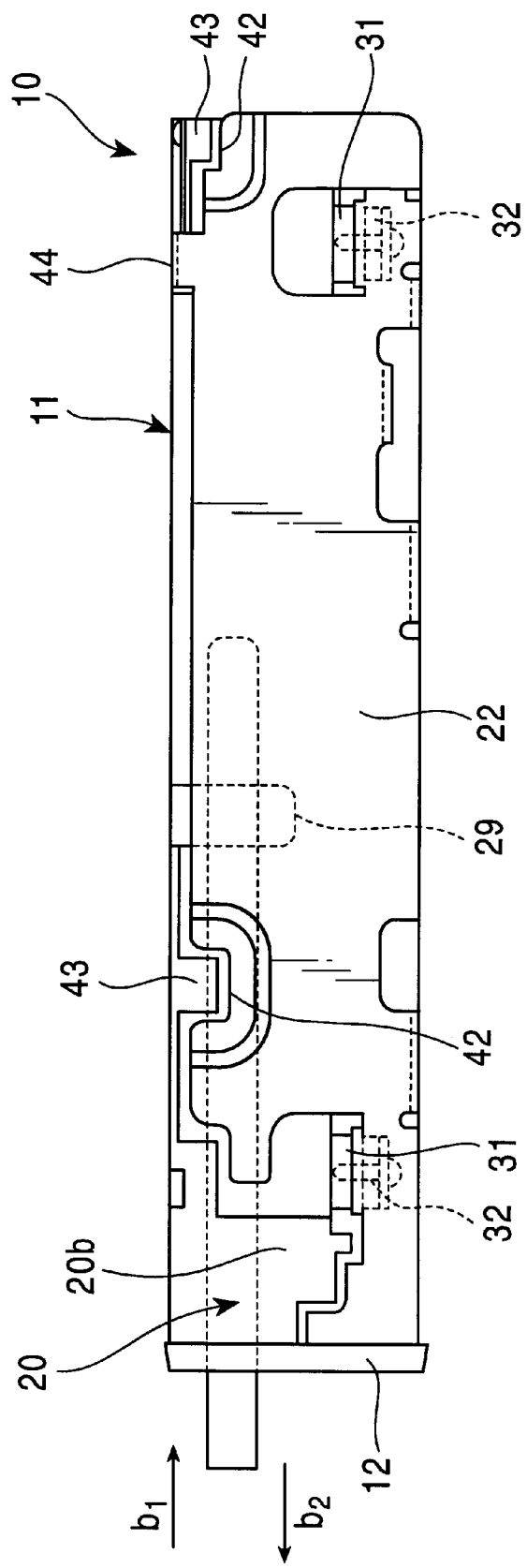
FIG. 4 is a side view of FIG. 3.
Figure 9:
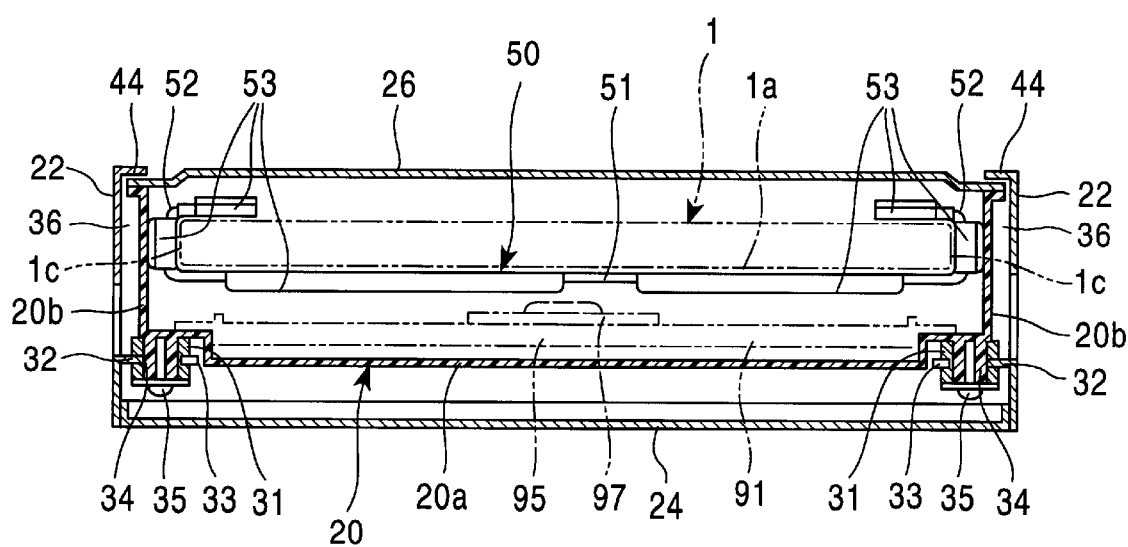
FIG. 9 is a cross-sectional view taken along the line IX—IX of FIG. 3.
Figure 10:
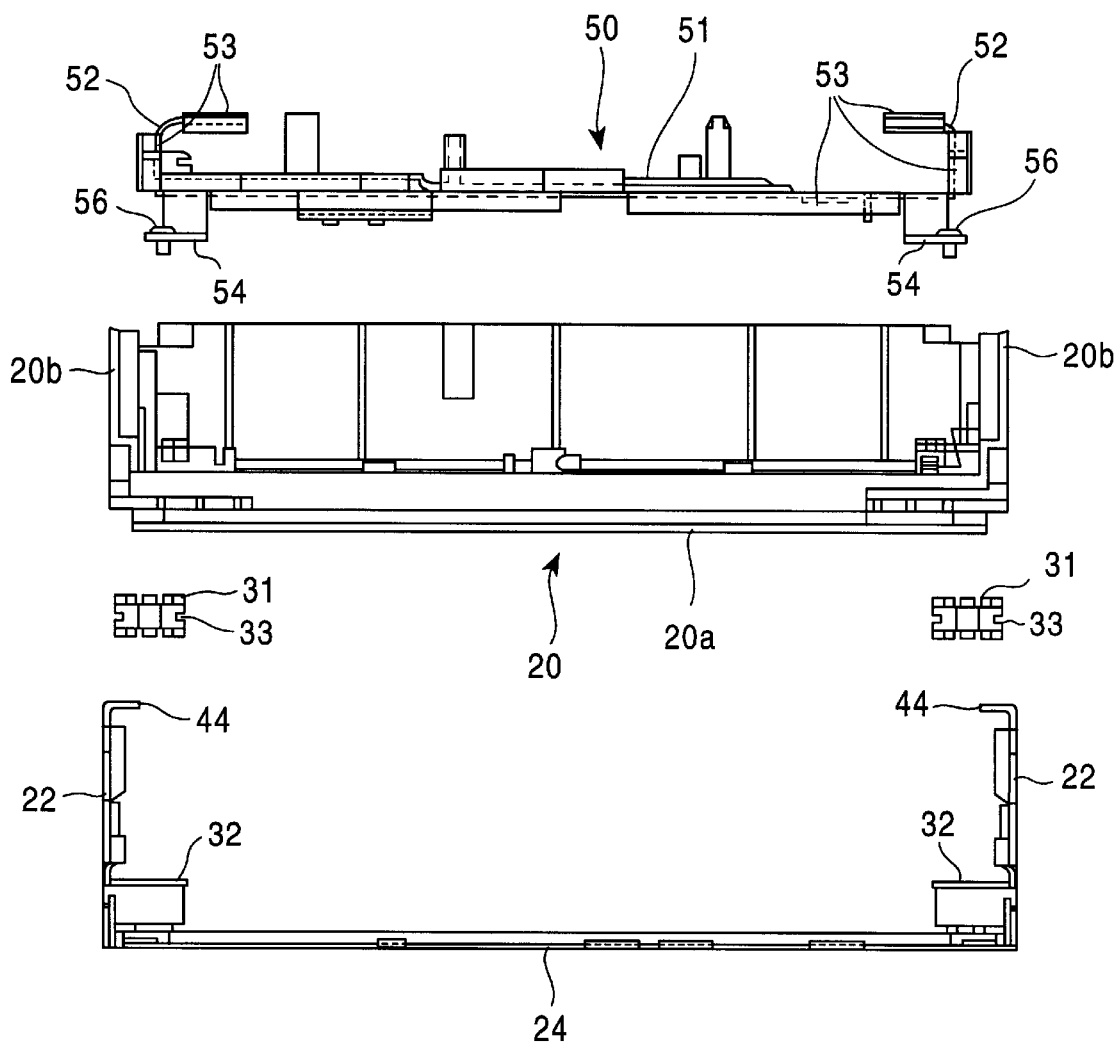
FIG. 10 is an exploded front view showing the cartridge insertion guide, a resin chassis, side frames, and insulators.
Figure 11:
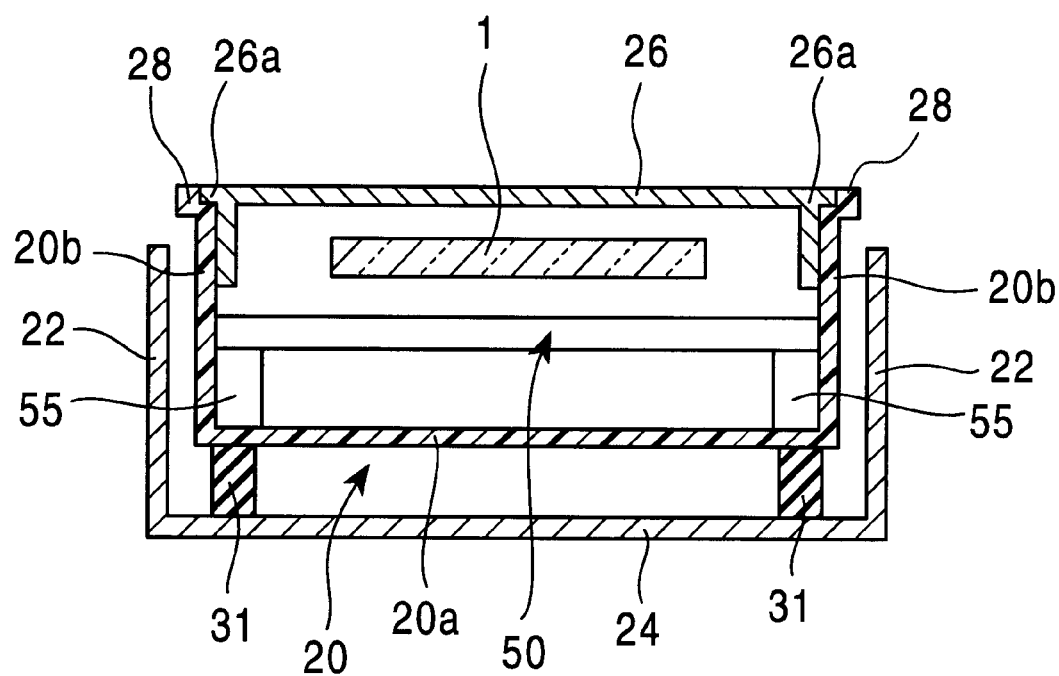
FIG. 11 is a cross-sectional view showing schematically the relationship among the cartridge insertion guide, the resin chassis, the side frames, and the insulators.

To load the cartridge 1, as shown in FIGS. 1 and 3, the cartridge 1 is horizontally inserted in the direction of the arrow $b_1$ from the front end 1b into the cartridge insertion slot 13, and the cartridge 1 is inserted between the guide tabs 52 on the main body 51 of the cartridge insertion guide 50 while pushing the inner cover 40 open inward by the cartridge 1, as shown by one-dot chain lines in FIGS. 5 and 9. When the cartridge 1 is inserted in the direction of the arrow $b_1$ into the cartridge guide 50 to the position $P_{11}$ shown by the dotted lines in FIG. 5, the front end 1b abuts against the roller 59 provided on the distal end of the shutter actuating lever 57 and thereafter, the shutter actuating lever 57 is pressed by the cartridge 1 to be rotated about the supporting pin 58 in the direction of the arrow $c_1$ against the ejecting spring 60.

Figure 12:
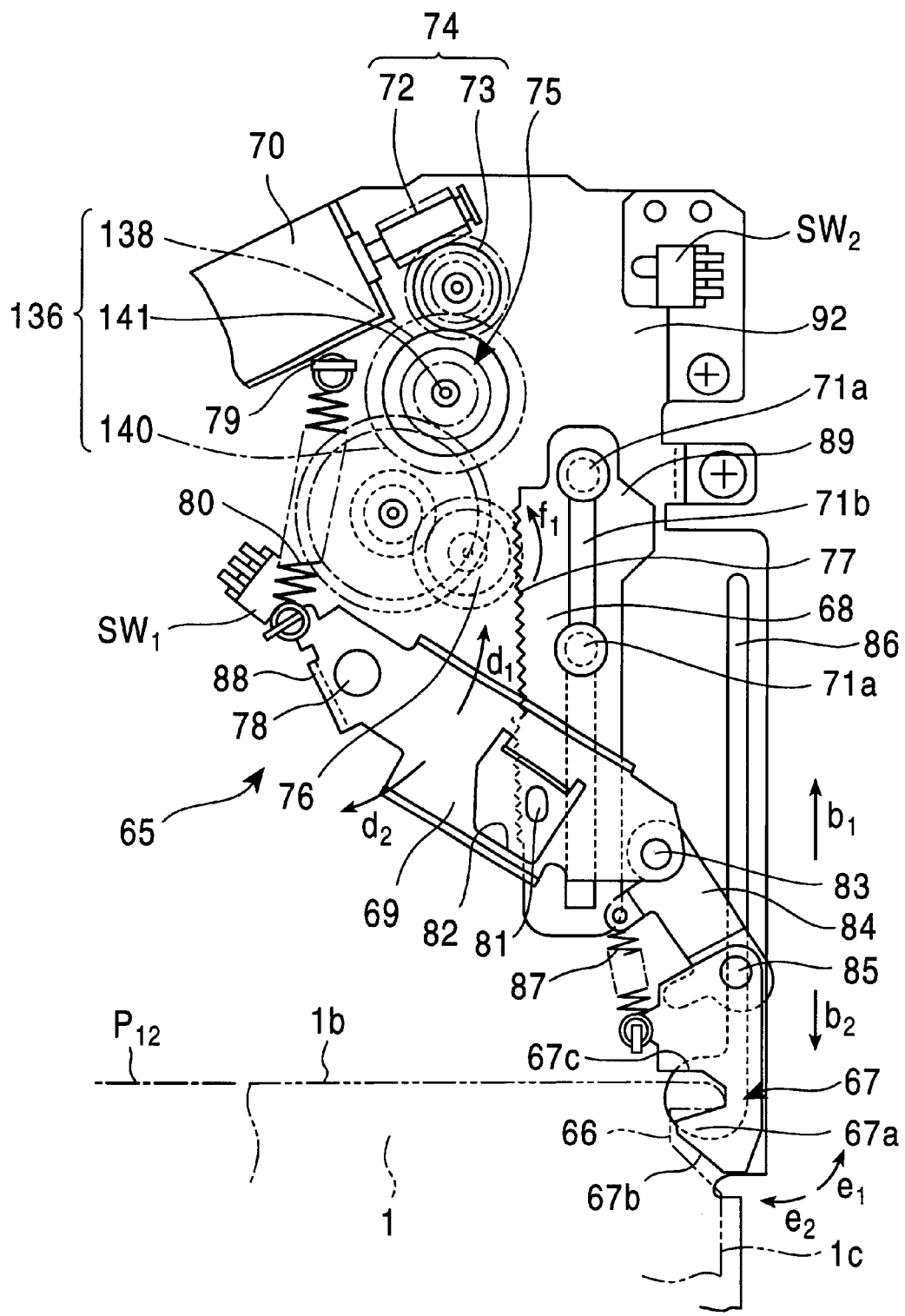
FIG. 12 is a plan view showing a start of retraction of a cartridge retraction device.

When the cartridge 1 is inserted into the cartridge insertion guide 50 in the direction of the arrow $b_1$ to a retraction start position $P_{12}$ shown by two-dot chain lines in FIG. 5, the distal end 67a of the hook 67 relatively rides on one side surface 1c of the cartridge 1 by means of an inclined surface 67b of the hook 67, as shown by one-dot chain lines in FIG. 12. In this case, the hook 67 first moves away in the direction of the arrow $e_1$ about the supporting pin 85 against a hook spring 87, and then, is rotationally returned in the direction of the arrow $e_2$ by the hook spring 87, and the distal end 67a is engaged with the retracting recess 66.

When the cartridge 1 is slightly pushed in the direction of the arrow $b_1$ after the engagement of the hook 67, the rotary lever 69 is slightly rotated about the supporting pin 78 in the direction of the arrow $d_1$ via the hook 67 and the interlocking link 84, whereby a cartridge-in switch $SW_1$ is turned on. Then, as shown in FIG. 12, the cartridge retracting motor 70 is driven in the forward direction, whereby the pinion 76 is actuated into rotation in the direction of the arrow $f_1$ via the gear train 75 having the worm gear 74, and the slider 68 is actuated into sliding in the direction of the arrow $b_1$ via the rack 77. The slider 68 then rotationally drives the rotary lever 69 by means of the driving projection 89 in the direction of the arrow $d_1$ against the ejecting spring 80, whereby the hook 67 is retracted in the direction of the arrow $b_1$ via the interlocking link 84.

Figure 13:
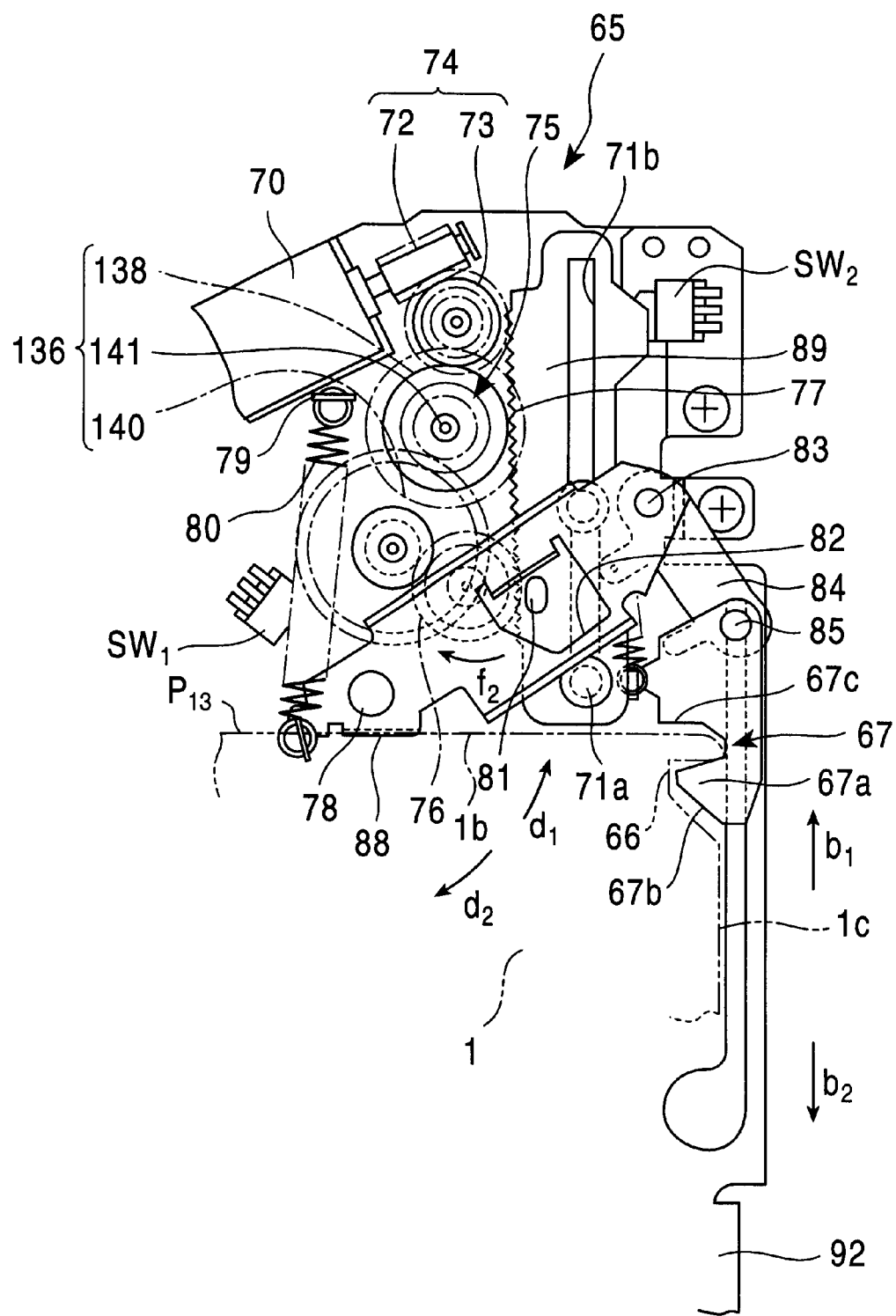
FIG. 13 is a plan view showing completion of retraction of the cartridge retraction device.
Figure 14:
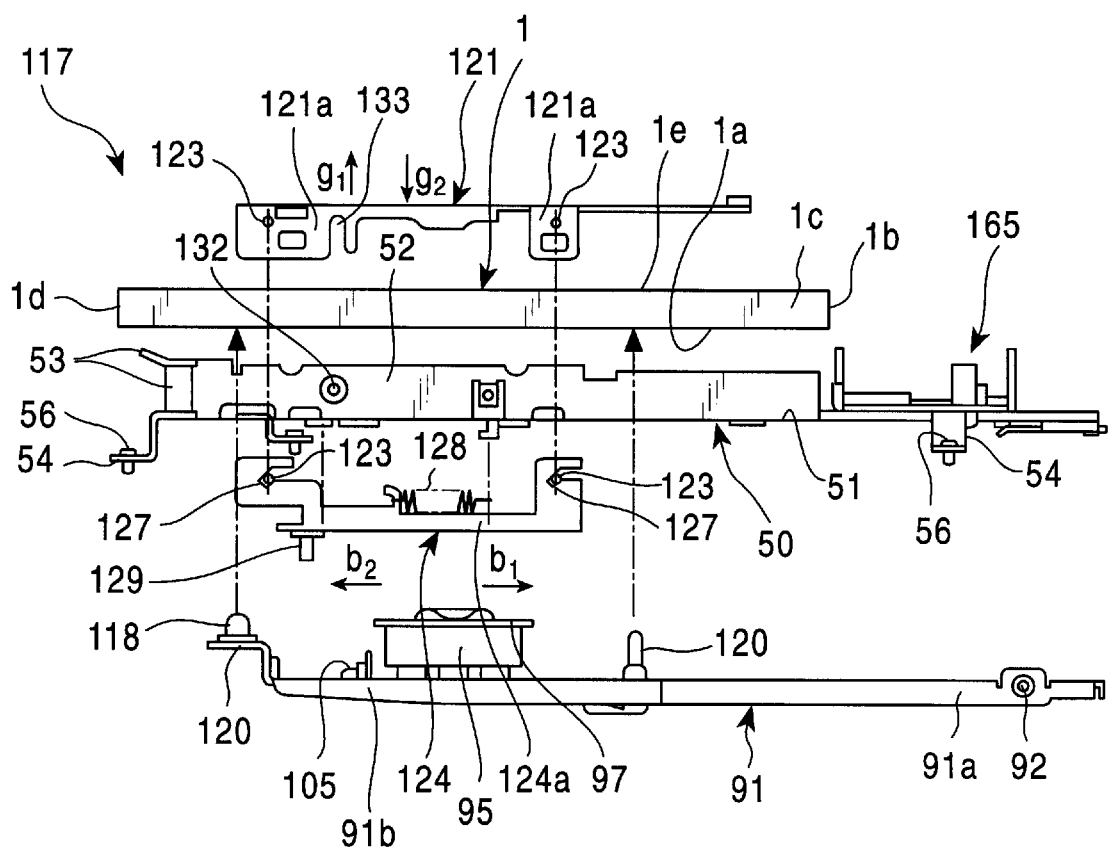
FIG. 14 is an exploded side view of a cartridge positioning device.
Figure 15:
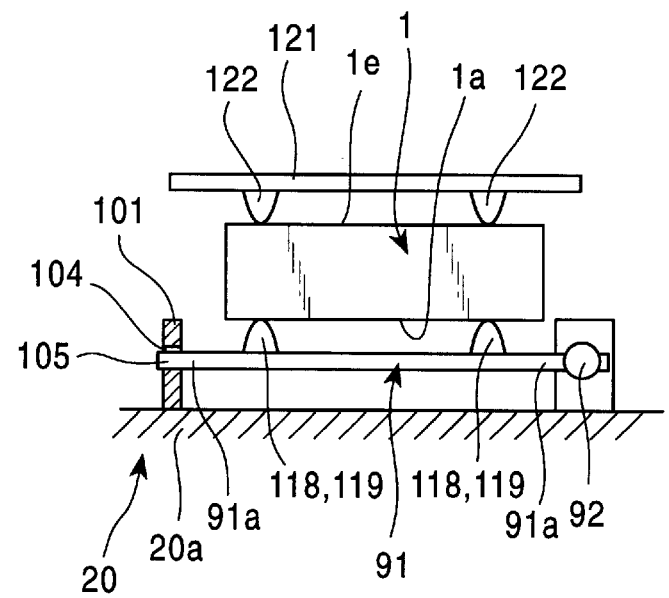
FIG. 15 is a side view showing schematically a cartridge positioning state of the cartridge positioning device.

That is, the rotational drive of the cartridge retracting motor 70 in the forward direction after turning on the cartridge-in switch $SW_1$ causes the hook 67 to be automatically retracted along the guide slot 86 in the direction of the arrow $b_1$ from a retraction start position $P_{12}$ shown by the solid lines in FIGS. 5 and 12 to a retraction end position $P_{13}$ shown by the one-dot chain line in FIG. 5 and by the solid lines in FIG. 13, and the retracting recess 66 is pulled by the hook 67, so that the cartridge 1 is automatically retracted in the direction of the arrow $b_1$ from the retraction start position $P_{12}$ to the retraction end position $P_{13}$. With this retracted action of the cartridge 1 in the direction of the arrow $b_1$, the shutter actuating lever 57 is rotated about the supporting pin 58 in the direction of the arrow $c_1$ to the shutter open position shown by the one-dot chain line in FIG. 5 against the ejecting spring 60, and the roller 59 relatively pushes the shutter 7 along the front end 1b of the cartridge 1 in the direction of the arrow $a_1$, so that the shutter 7 is automatically opened and the bottom opening 6 of the cartridge 1 is opened.

As shown in FIG. 13, when the cartridge 1 is retracted in the direction of the arrow $b_1$ to the retraction end position $P_{13}$, the front end 1b of the cartridge 1 abuts with a cartridge stopper 88 to be stopped, and at the same time, a cartridge-in completion switch $SW_2$ mounted on the main body 59 is turned on by a cam 89 integrally formed with the side surface of the slider 68 opposite to the rack 77 to stop the cartridge retracting motor 70, and the hook 67 is locked at the retraction end position $P_{13}$ by a reverse rotation-preventing feature of the worm gear 74 in the gear train 75.

Then, when the cartridge 1 is ejected after the information is recorded on and/or reproduced from the optical disc 5 to be described later, the cartridge retracting motor 70 is driven in the reverse direction in the state of FIG. 13, the slider 68 is actuated into sliding in the direction of the arrow $b_2$ by the pinion 76 that is actuated into rotation in the direction of the arrow $f_2$, and the rotary lever 69 is actuated into rotation about the supporting pin 78 in the direction of the arrow $d_2$ by the ejecting spring 80 by a reverse operation of the loading of the cartridge 1, so that the hook 67 is automatically ejected in the direction of the arrow $b_2$ along the guide slot 86 from the retraction end position $P_{13}$ shown in FIG. 13 to the retraction start position $P_{12}$ shown in FIG. 12. Then, the front end 1b of the cartridge 1 is pressed by a cartridge presser portion 67c formed on the hook 67, so that the cartridge 1 is automatically ejected in the direction of the arrow $b_1$ from the retraction end position $P_{13}$ to the retraction start position $P_{12}$. In this case, since the shutter actuating lever 57 is also actuated into rotation about the supporting pin 58 by the ejecting spring 60 in the direction of the arrow $c_2$ from the shutter open position shown by one-dot chain lines in FIG. 5, the cartridge 1 is ejected by resilient forces of the two ejecting springs 80 and 60 in the direction of the arrow $b_1$. With the rotation of the shutter actuating lever 57 in the direction of the arrow $c_2$, the shutter 7 is automatically closed by a spring contained therein in the direction of the arrow $a_2$.

When the cartridge 1 is ejected in the direction of the arrow $b_2$ to the retraction start position $P_{12}$, the cartridge-in switch $SW_1$ is turned off by the rotary lever 69 to stop the cartridge retracting motor 70. At this time, the rear end 1d of the cartridge 1 is projected by a fixed amount to the outside of the cartridge insertion slot 13. Therefore, if the rear end 1d is pinched from the outside of the cartridge insertion slot 13 to draw the cartridge 1 out of the optical disc apparatus 10 in the direction of the arrow $b_2$, the hook 67 is rotated about the supporting pin 85 against the hook spring 87 to move away in the direction of the arrow $e_1$ from the state of FIG. 12, so that the cartridge 1 can be easily drawn out in the direction of the arrow $b_2$. With the drawing of the cartridge 1 out of the optical disc apparatus 10, the shutter actuating lever 57 is finally rotated by the ejecting pin 60 to a shutter close position shown by the solid lines in FIG. 5, whereby the cartridge 1 can be drawn out of the optical disc apparatus 10 with the shutter 7 closed to the close position in the direction of the arrow $a_2$.

(5) Mechanical Deck and Disc Loading Device

A mechanical deck 91 and a disc loading device 100 will now be described with reference to FIGS. 6, 7, 8, 9, 15, 26, and 29 to 32.

The mechanical deck 91 formed of a sheet metal is arranged in the resin chassis 20 below the cartridge insertion guide 50. A pair of supporting pins 92 coaxially horizontally mounted on both sides of a rear end 91a of the mechanical deck 91 are detachably secured by a pair of set screws 94 on a pair of mounting bases 93 that are integrally formed on the inside of side plates 20b on the rear end side of the resin chassis 20. Therefore, the mechanical deck 91 is mounted movably up and down in the directions of the arrows $g_1$, $g_2$ about the supporting pins 92. A spindle motor 95 is mounted above the mechanical deck 91 at the position offset toward the front end 91b of the mechanical deck 91, and a disc table 97 integrated with a spindle 96 is arranged above the spindle motor 95. A head transfer device 170 to be described later is mounted above the mechanical deck 91 on the rearward side of the spindle motor 95, and the spindle motor 95 is arranged on the spindle and a head center $P_1$ of the mechanical deck 91.

Figure 7:
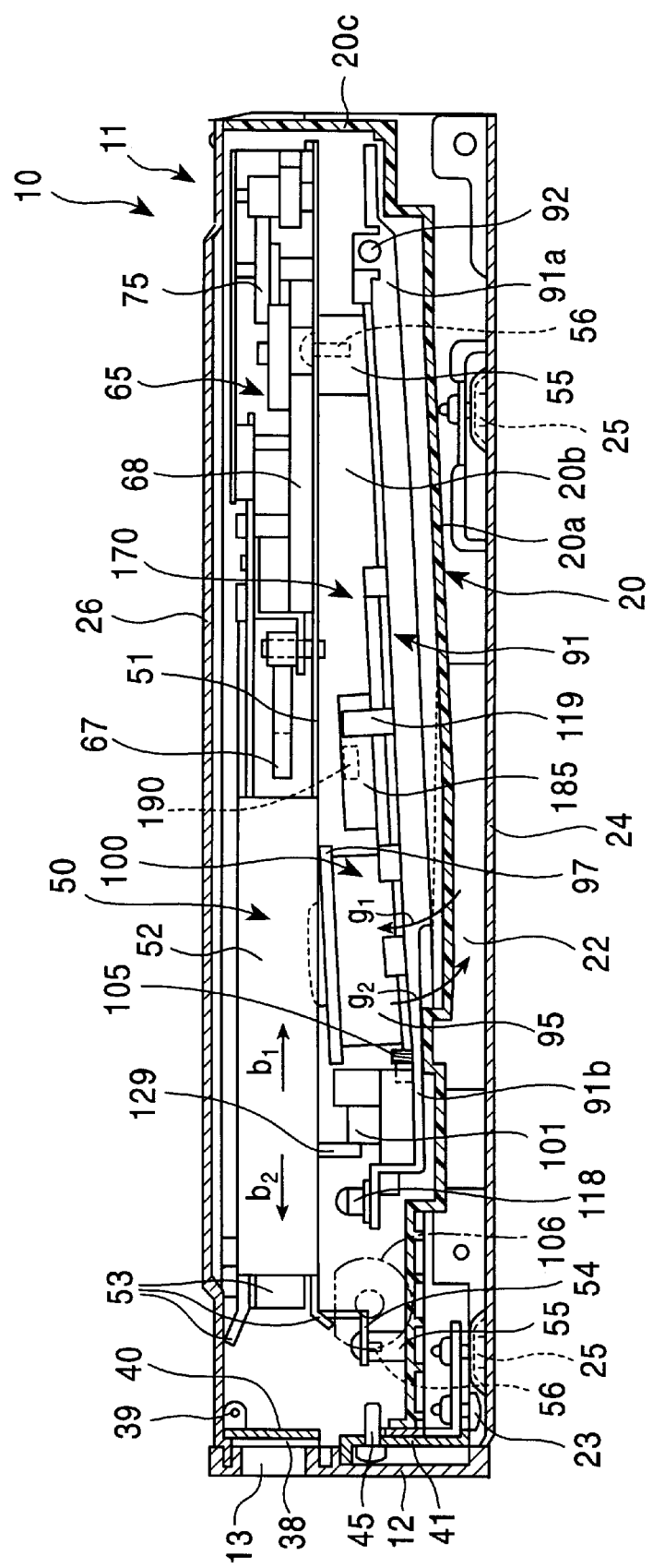
FIG. 7 is a cross-sectional view taken along the line VII—VII of FIG. 3 showing a downward movement of a mechanical deck.
Figure 8:
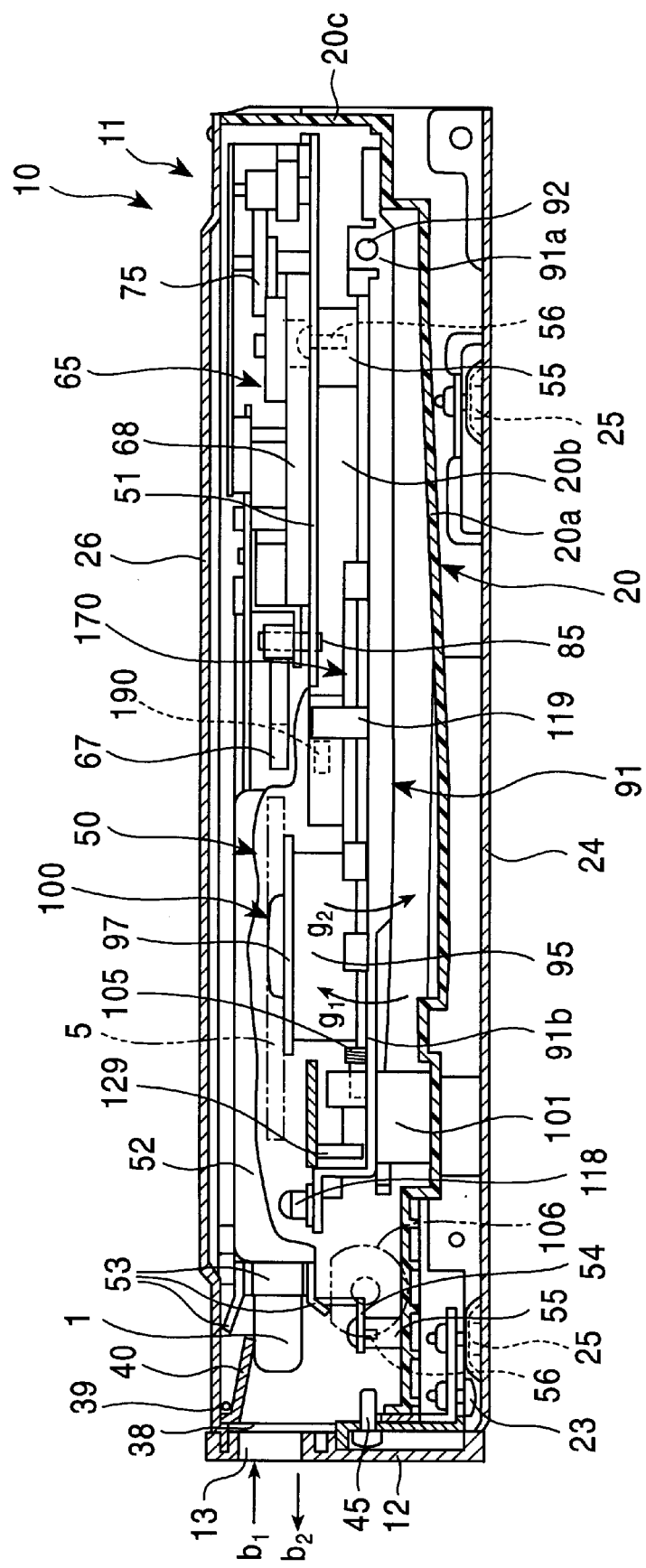
FIG. 8 is a cross-sectional view taken along the line VIII—VIII of FIG. 3 showing an upward movement of a mechanical deck.

The disc loading device 100 corresponds to a mechanical deck-lifting mechanism which relatively loads the optical disc 5 on the disc table 97 by moving the mechanical deck 91 from a downward position shown in FIG. 7 to an upward position shown in FIG. 8, and is mounted on the bottom plate 20a of the resin chassis 20 at the forward position of the mechanical deck 91. The disc loading device 100 has a slide cam 101 formed of synthetic resin, and the slide cam 101 is loosely fitted into a plurality of guide slots 103 by means of a plurality of guide pins 102 integrally formed on the bottom plate 20a of the resin chassis 20. The slide cam 101 is mounted on the bottom surface 20a to be slidable in the directions of the arrows $h_1$, $h_2$ that are the directions perpendicular to the direction of insertion of the cartridge (the direction of the arrow $b_1$). A pair of cam slots 104 are formed on the rearward (in the direction of the arrow $b_1$) side of the slide cam 101 in a state of being inclined in parallel with each other in a vertical direction. A pair of cam follower pins 105 mounted on the side of the front end 91b of the mechanical deck 91 are slidably loosely fitted in the cam slots 104.

Mounted on the bottom plate 20a on the forward side of the slide cam 101 are a disc loading motor 106, a gear train 110 including a worm gear 106 consisting of a worm 107 and a worm wheel 108 actuated by the loading motor 106, and a pinion 111 of an output end of the gear train 110. A rack 112 integrally formed on the side of the front surface of the slide cam 101 is meshed with the pinion 111.

Figure 32:
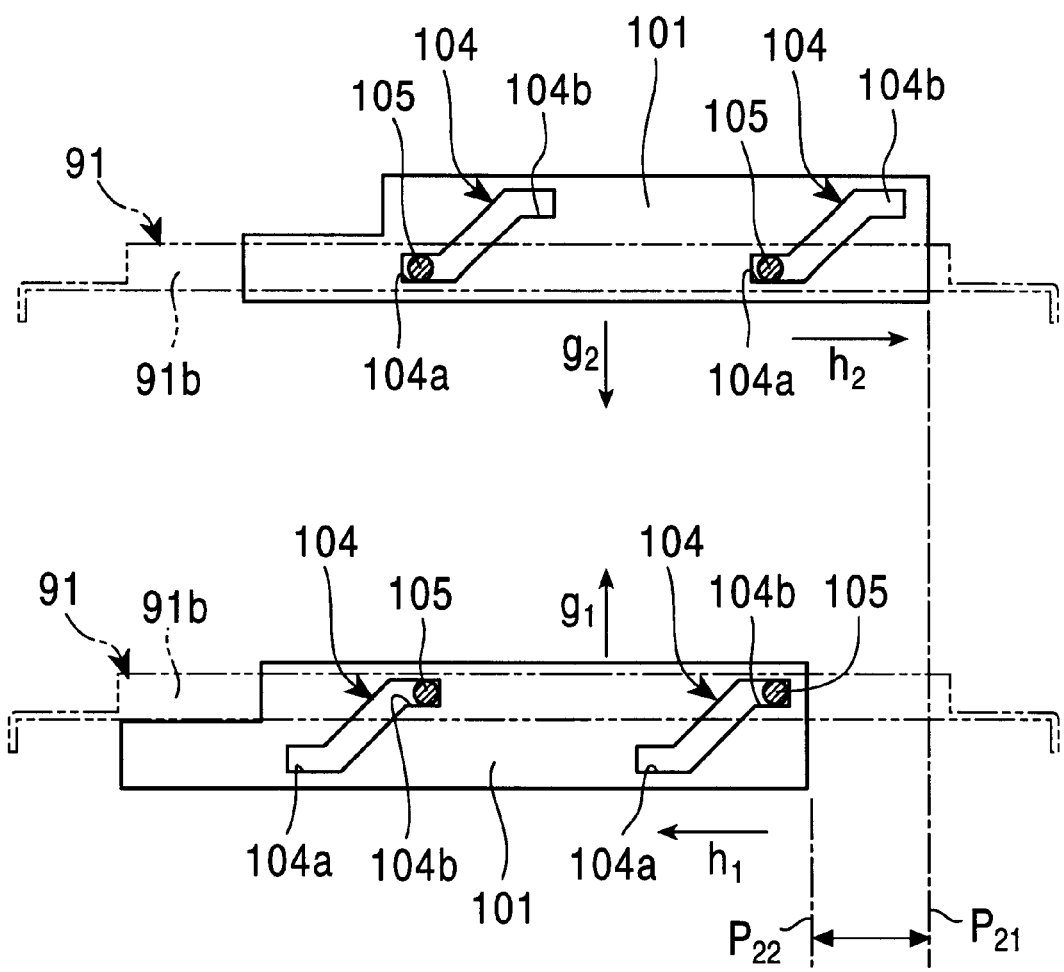
FIG. 32 is a rear view illustrating a slide cam of the disc loading device.

In an unloading state of the optical disc 5, the slide cam 101 is slid in the direction of the arrow $h_2$ to an unloading position $P_{21}$ shown in FIG. 32, and the cam follower pins 105 are moved downward in parallel in the direction of the arrow $g_2$ to the lower ends 104a of the cam slots 104, whereby the mechanical deck 91 is moved downward in the direction of the arrow $g_2$ about the supporting pins 92, as shown in FIG. 7.

In the unloading state, the cartridge 1 is horizontally inserted from the cartridge insertion slot 13 into the cartridge insertion guide 50 from the direction of the arrow $b_1$, as shown in FIG. 8, and is automatically retracted by the cartridge retraction device 65 to the retraction end position $P_{13}$ shown by the one-dot chain line in FIG. 5.

Figure 6:
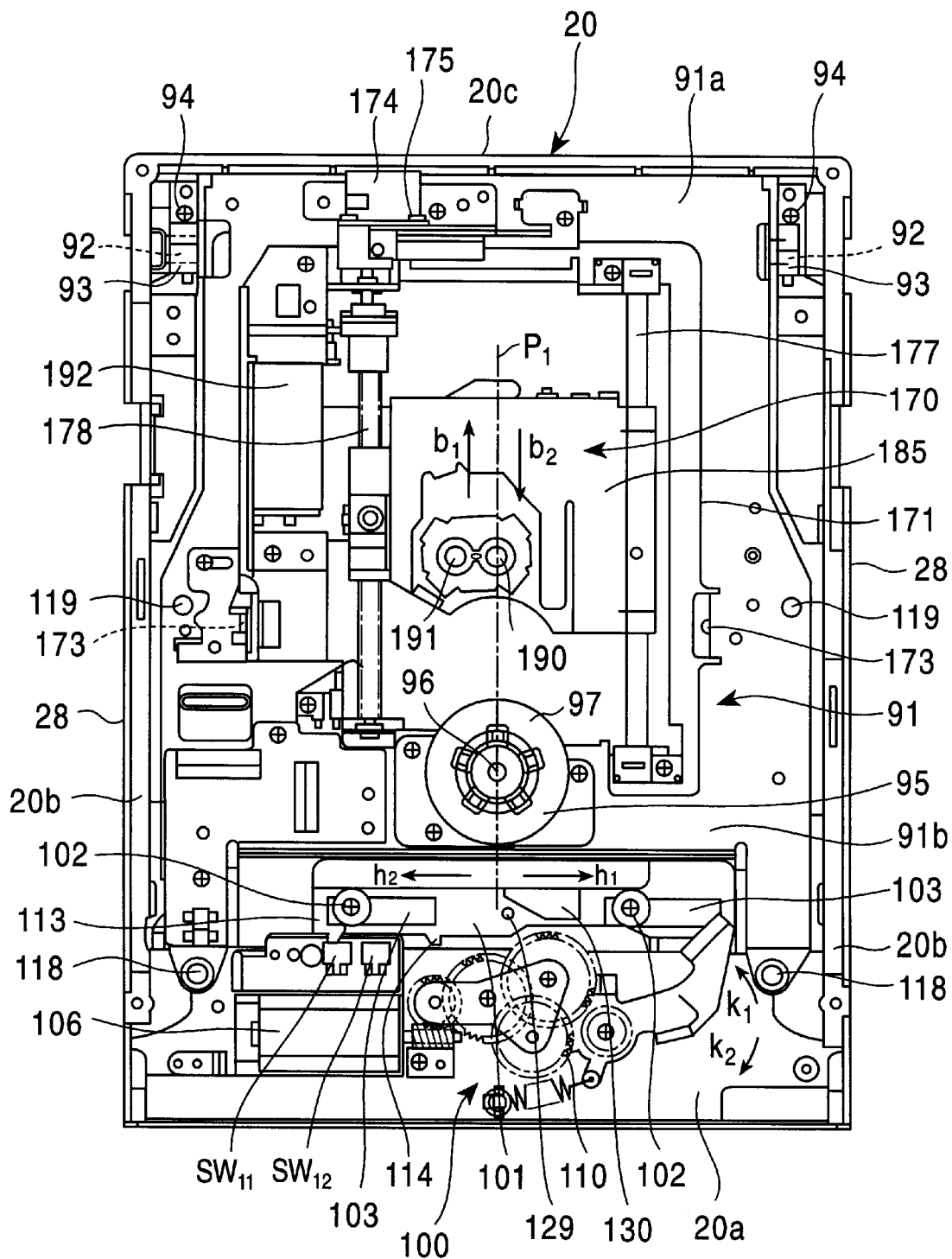
FIG. 6 is a plan view showing a state in which the top cover and the cartridge insertion guide are removed to show a mechanical deck portion.

When the cartridge-in completion switch $SW_2$ is turned on, the disc loading motor 106 is driven in the forward direction, the pinion 111 is actuated into rotation in the direction of the arrow $i_1$ via the gear train 110 having the worm gear 109, and the slide cam 101 is actuated into sliding in the direction of the arrow $h_1$ from the unloading position $P_{21}$ to a loading position $P_{22}$ shown in FIG. 32. Then, the cam follower pins 105 are actuated to move upward from the lower ends 104a to the upper ends 104b in the direction of the arrow $g_1$, and a loading switch $SW_{11}$ mounted on the bottom plate 20a of the resin chassis 20 is turned on by a projection 113 of the slide cam 101, as shown in FIG. 6, to stop the disc loading motor 106. The cam follower pins 105 are locked at the upward position in the direction of the arrow $g_1$ by a reverse rotation-preventing feature of the worm gear 109 in the gear train 110.

The cam follower pins 105 are actuated to move upward by the slide cam 101 in the direction of the arrow $g_1$, whereby the mechanical deck 91 is moved upward by the rotary motion about the supporting pins 92 in the direction of the arrow $g_1$ from the downward position shown in FIG. 7 to the upward position shown in FIG. 8 and is locked at the upward position in a horizontal state. Then, the disc table 97 of the spindle motor 95 is inserted into the cartridge 1 through the opening 61 of the cartridge insertion guide 50 and the bottom opening 6 of the cartridge 1 to be in a vertical state, and the optical disc 5 in the cartridge 1 is horizontally chucked by the chucking pulley 8 on the disc table 97. As described below, the optical disc 5 is rotated by the spindle motor 95 in the cartridge 1 to perform recording and/or reproducing information on or from the optical disc 5.

Figure 26:
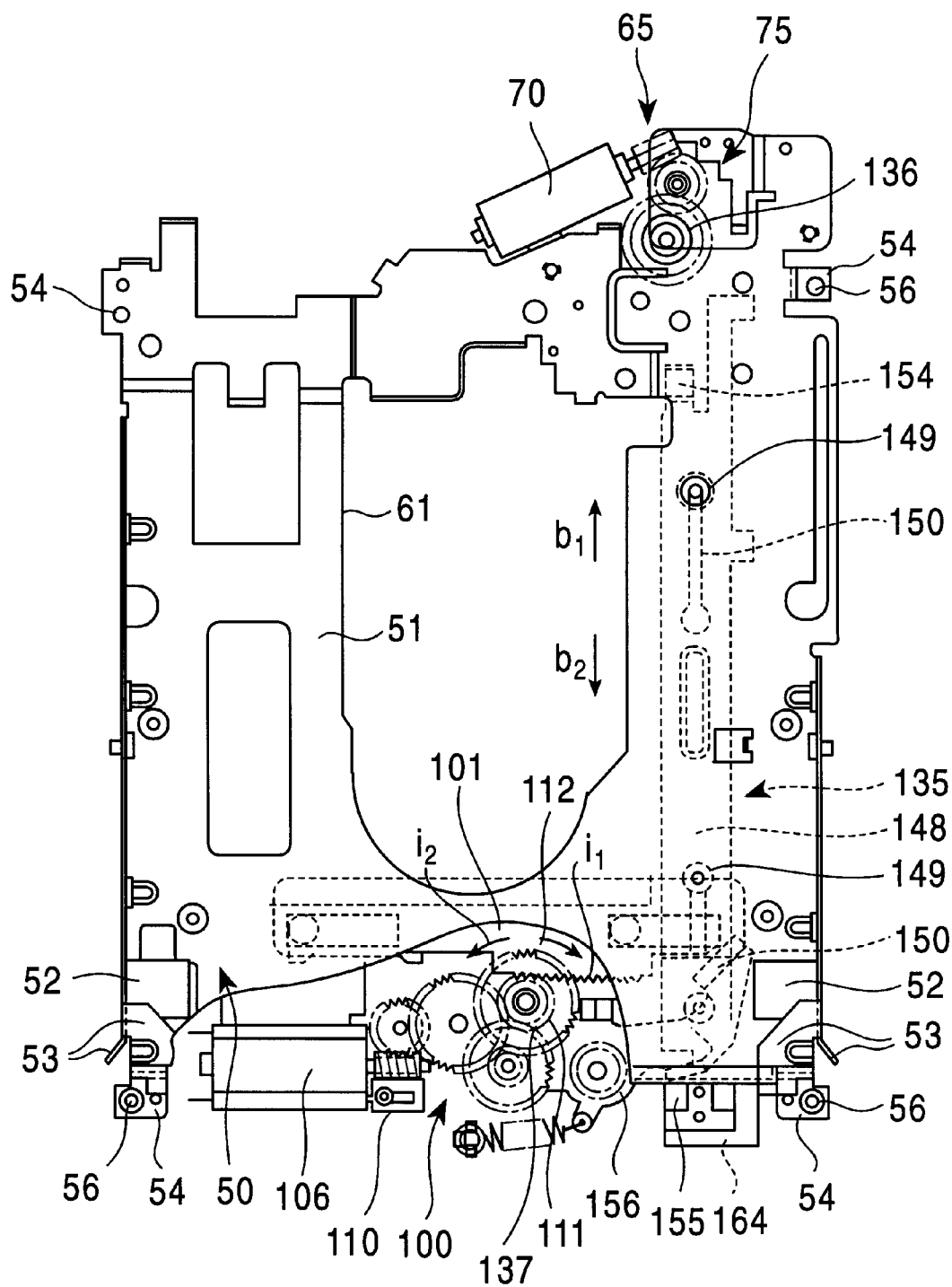
FIG. 26 is a plan view illustrating the entire emergency ejection device.

When the optical disc 5 is unloaded after the information is recorded on and/or reproduced from the optical disc 5, the disc loading motor 106 is driven in the reverse direction in the state of FIG. 26, the slide cam 101 is slidingly returned in the direction of the arrow $h_2$ from the loading position $P_{22}$ to the unloading position $P_{21}$ by the pinion 111 that is actuated into rotation in the direction of the arrow $i_2$ by a reverse operation of the loading of the optical disc 5, so that the cam follower pins 105 are moved in the direction of the arrow $g_2$ from the upper ends 104b to the lower ends 104a of the cam slots 104. The mechanical deck 91 is moved downward by the rotary motion about the supporting pins 92 in the direction of the arrow $g_2$ from the upward direction shown in FIG. 8 to the downward direction shown in FIG. 7, so that the disc table 97 is separated from the optical disc 5 in the direction of the arrow $g_2$ to be lowered below the cartridge 1 in the direction of the arrow $g_2$. Therefore, the cartridge 1 can be ejected by the cartridge retraction device 65 in the direction of the arrow $b_2$, as described above.

(6) Cartridge Positioning Device

A cartridge positioning device 117 will now be described with reference to FIGS. 14 to 25.

The cartridge positioning device 117 is intended to position the cartridge 1 by horizontally mounting the cartridge 1 on a pair of reference pins 118 and a pair of height-controlling pins 119 provided on the mechanical deck 91 when the optical disc 5 in the cartridge 1 is horizontally loaded on the disc table 97 by the disc loading device 100.

That is, the height-controlling pads 120 are integrally formed on both sides of the front end 91b of the mechanical deck 91, and the reference pins 118 are vertically mounted on the tops of the height-controlling base 120. The height-controlling pins 119 are vertically mounted on symmetrical positions of the reference pins 118 with respect to the center $P_{31}$ of the spindle motor 95.

A cartridge presser member 121 formed of a sheet metal is horizontally arranged between the tops of the guide tabs 52, and six cartridge-pressing projections 122 are projected downward from both side edges of the cartridge presser member 121. A pair of side plates 121a formed by bending the cartridge presser member 121 vertically downward at its both side edges are inserted into both sides of the guide tabs 52 from above. Four cam follower pins 123 are horizontally mounted on both front and rear ends of the side plates 121a. A slide plate 124 is mounted below the main body 51 of the cartridge insertion guide 50 via a plurality of guide pins and guide slots 126 so as to be slidable in the directions of the arrows $b_1$, $b_2$, and a pair of side plates 124a formed by bending the slide plate 124 vertically upward at its both side edges are inserted into both sides of the side plates 121a from below. Four cam slots 127 are formed in both front and rear ends of the slide plates 124a in a state being inclined in parallel with each other in a vertical direction, and the four cam follower pins 123 are slidably loosely fitted in the four cam slots 127. A pair of guide pins 132 formed on both sides of the guide tabs 52 are vertically slidably engaged with vertical guide slots 133 formed in both side plates 121a, and the cartridge presser member 121 is mounted to the main body 51 so as to be movable up and down in the directions of the arrows $g_1$, $g_2$, respectively.

The above arrangements constitute a cartridge presser member-actuating mechanism 134 for moving up and down the cartridge presser member 121 by a parallel motion in the directions of the arrows $g_1$, $g_2$, respectively. A pair of positioning springs 128 each consisting of tensile springs stretched between the cartridge insertion guide 50 and the side plates 124a of the slide plate 124 are arranged on both sides of the cartridge insertion guide 50 in the direction parallel to the direction of insertion of the cartridge (in the directions of the arrows $b_1$, $b_2$), and the slide plate 124 is slidingly biased by the positioning springs 128 in the direction of the arrow $b_1$. A cam follower pin 129 is vertically mounted on the center lower portion on the front end side of the slide plate 124, and the cam follower pin 129 is inserted into a position on the forward side of the slide cam 101 of the disc loading device 100 from above. A cam 130 for actuating the cam follower pin 129 in the directions of the arrows $b_1$, $b_2$, respectively, is integrally formed with the side surface on the forward side of the slide cam 101.

Figure 16:
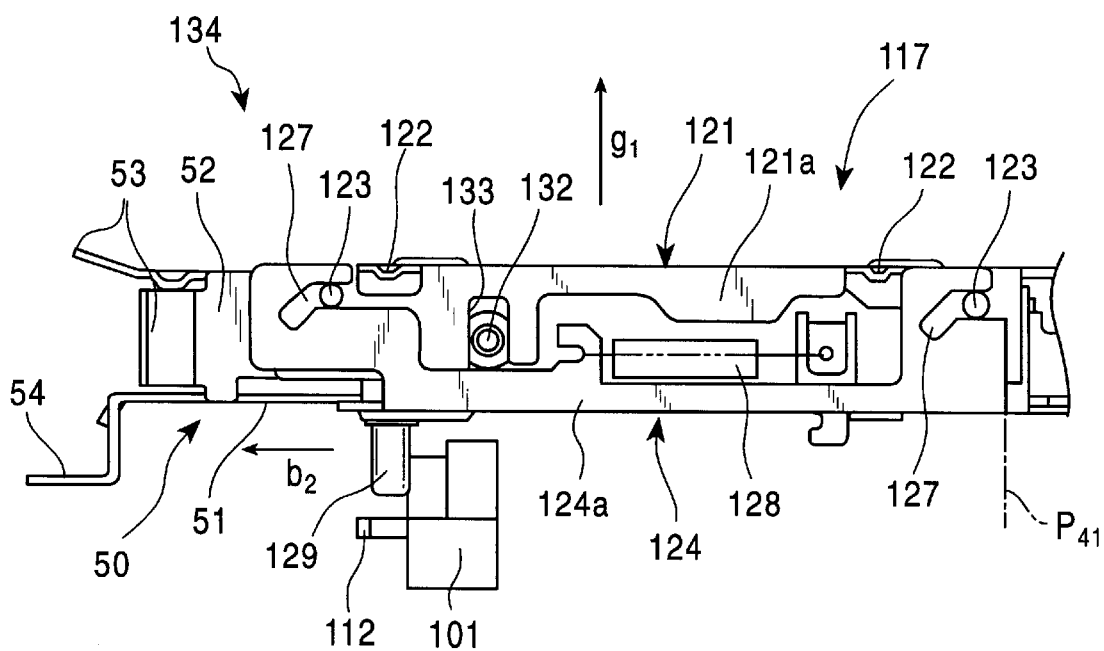
FIG. 16 is a side view showing a cartridge non-positioning state of the cartridge positioning device.
Figure 22:
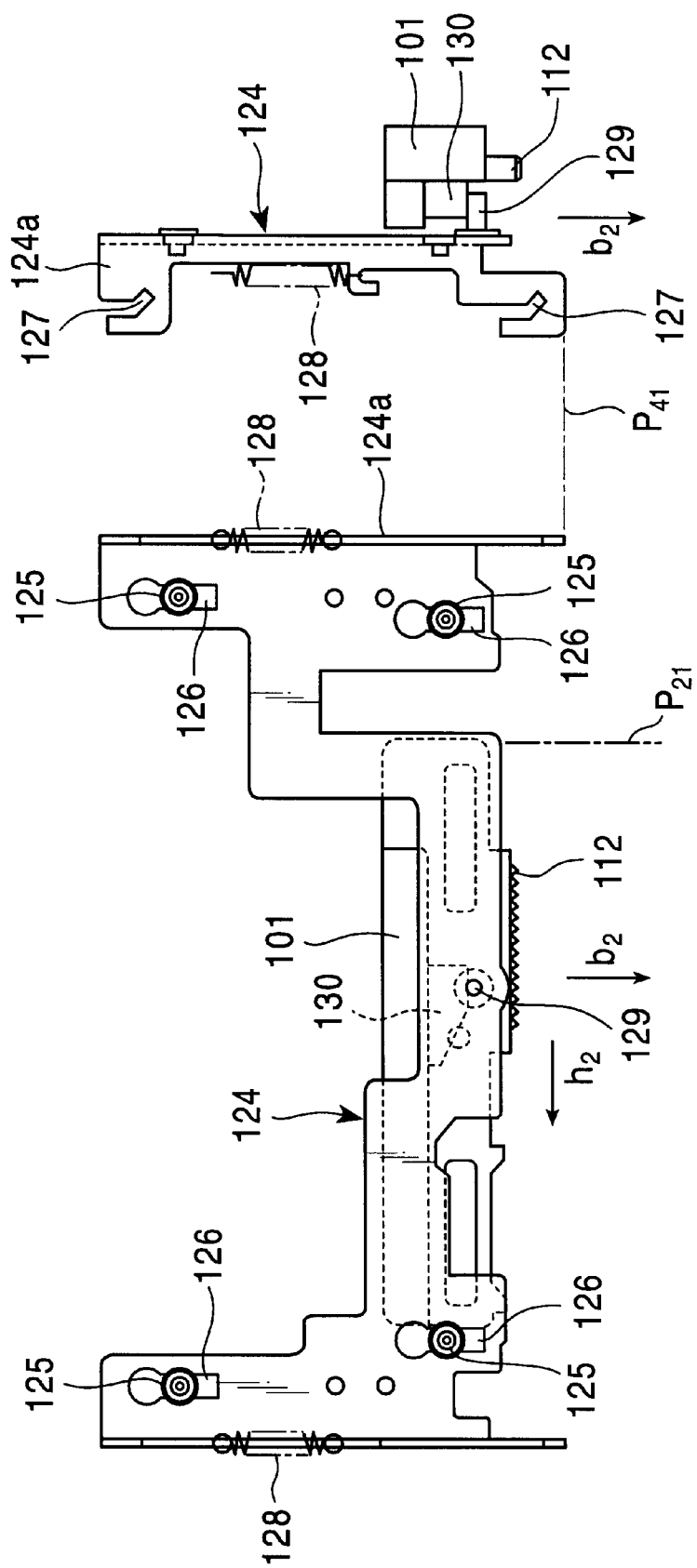
FIG. 22 includes a plan view and a side view each illustrating the relationship between a slide plate and a slide cam in the non-positioning state of the cartridge positioning device.

In the unloading state of the optical disc 5, the slide cam 101 is slid by the disc loading motor 106 in the direction of the arrow $h_2$ to the unloading position $P_{21}$, as shown in FIG. 22, whereby the cam follower pin 129 is ejected by the cam 130 in the direction of the arrow $b_2$, and the slide plate 124 is slid in the direction of the arrow $b_2$ to an unloading position $P_{41}$ against the positioning springs 128, as shown in FIGS. 22 and 16. The four cam follower pins 123 are pushed upward in parallel by the four cam slots 127 of the slide plate 124 in the direction of the arrow $g_1$, and the cartridge presser member 121 is moved upward by a parallel motion in the direction of the arrow $g_1$ to the upper position of the cartridge insertion guide 50.

Figure 18:
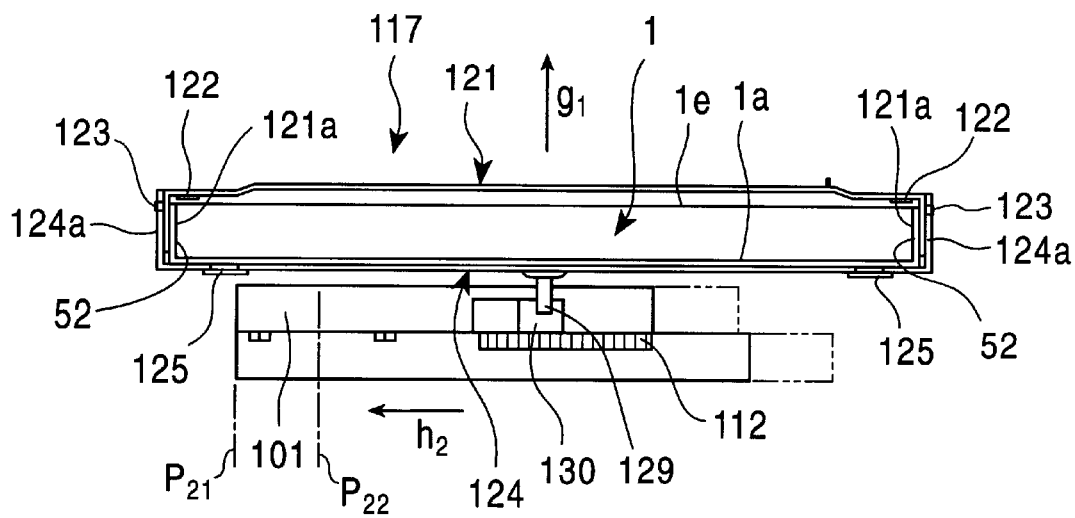
FIG. 18 is a front view of FIG. 16.
Figure 20:
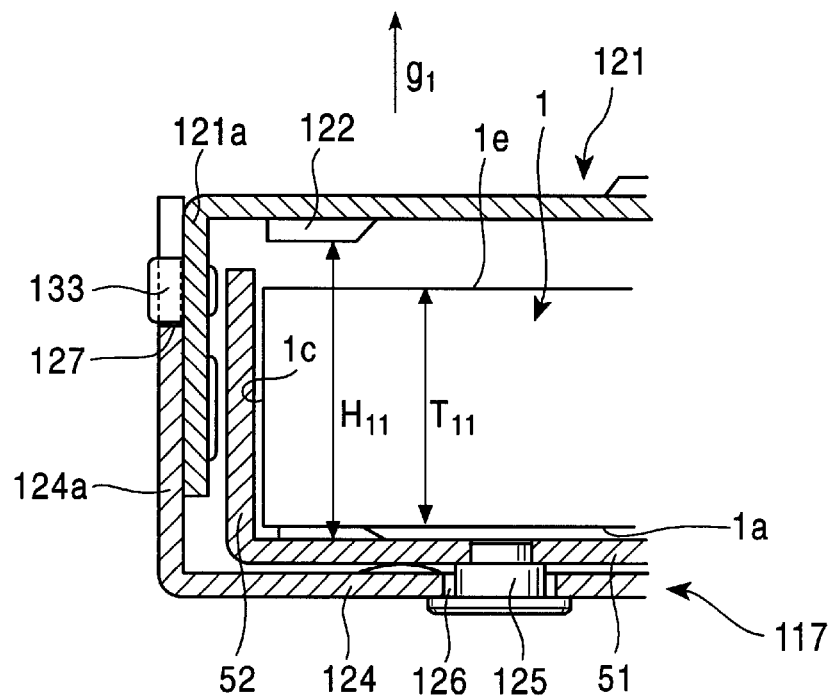
FIG. 20 is an enlarged sectional view of a main part of FIG. 18.

Therefore, in the unloading state, the six cartridge-pressing projections 122 are moved upward in the direction of the arrow $g_1$ to the height $H_{11}$ of the cartridge 1 that is higher than the thickness $T_{11}$ thereof with respect to the main body 51 of the cartridge insertion guide 50, as shown in FIGS. 18 and 20. As shown in FIG. 7, when the cartridge 1 is horizontally inserted into the main body 51 via the cartridge insertion slot 13 from the direction of the arrow $b_1$, and is automatically retracted by the cartridge retraction device 65 to the retraction end position $P_{13}$ shown by the one-dot chain line in FIG. 5 to be locked, the cartridge 1 can be smoothly inserted and retracted without being interfered with by the cartridge-pressing projections 122.

Figure 19:
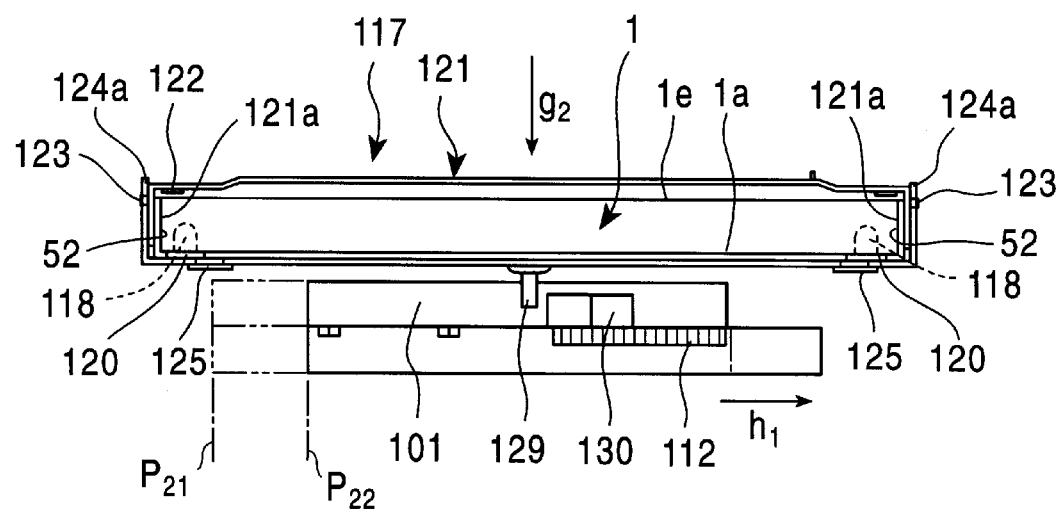
FIG. 19 is a plan view of FIG. 17.
Figure 21:
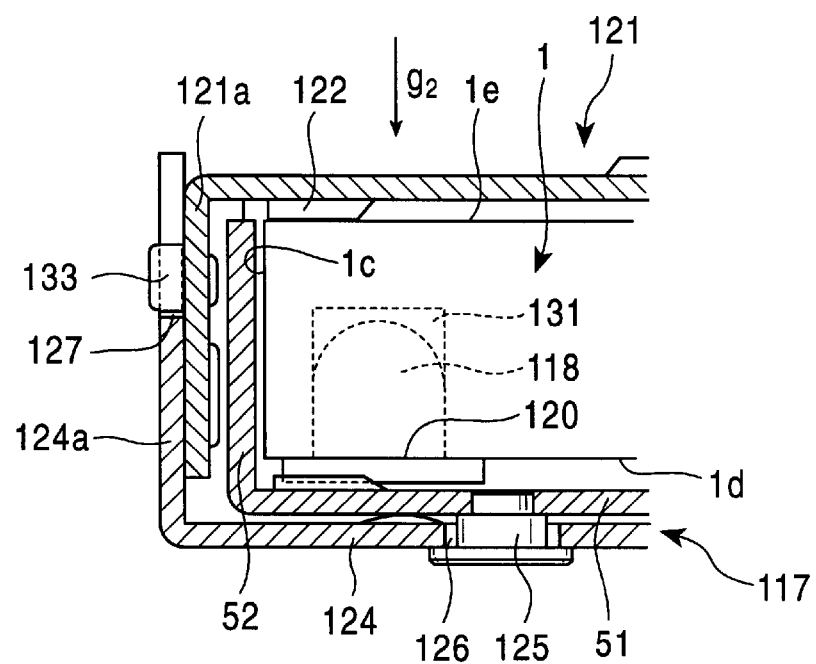
FIG. 21 is an enlarged sectional view of a main part of FIG. 19.

When the cartridge-in completion switch $SW_2$ is turned on to drive the disc loading motor 106 in the forward direction, and the slide cam 101 is actuated into sliding in the direction of the arrow $h_1$ from the unloading position $P_{21}$ to the loading position $P_{22}$, as shown in FIG. 32, to move the mechanical deck 91 upward in the direction of the arrow $g_1$ from the downward position shown in FIG. 7 to the upward position shown in FIG. 8, the reference pins 118 are inserted from below into a pair of positioning holes 131 formed in the bottom 1a of the main body 2 of the cartridge 1 in the direction of the arrow $g_1$, and the cartridge 1 is pushed upward in parallel by the height-controlling base 120 and the height-controlling pins 119 from the main body 51 of the cartridge insertion guide 50, as shown in FIGS. 19 and 21.

Figure 17:
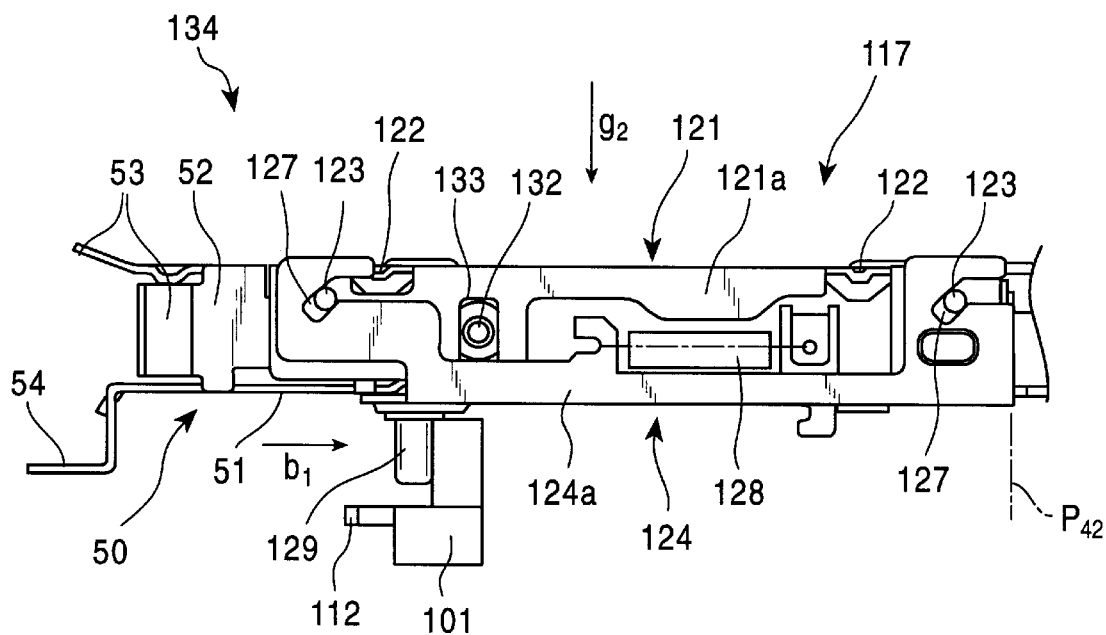
FIG. 17 is a side view showing a positioning state of the cartridge positioning device.
Figure 23:
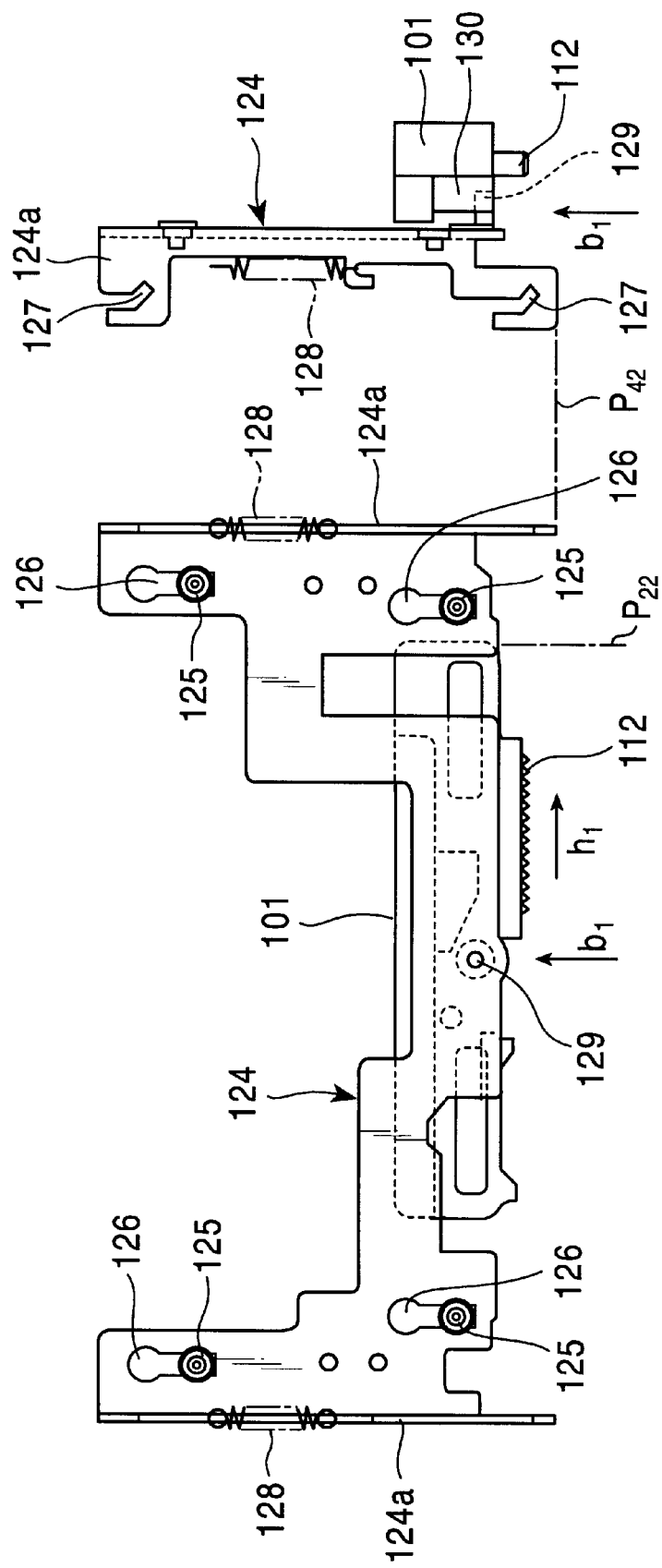
FIG. 23 includes a plan view and a side view each illustrating the relationship between a slide plate and a slide cam in the positioning state of the cartridge positioning device.
Figure 24A:
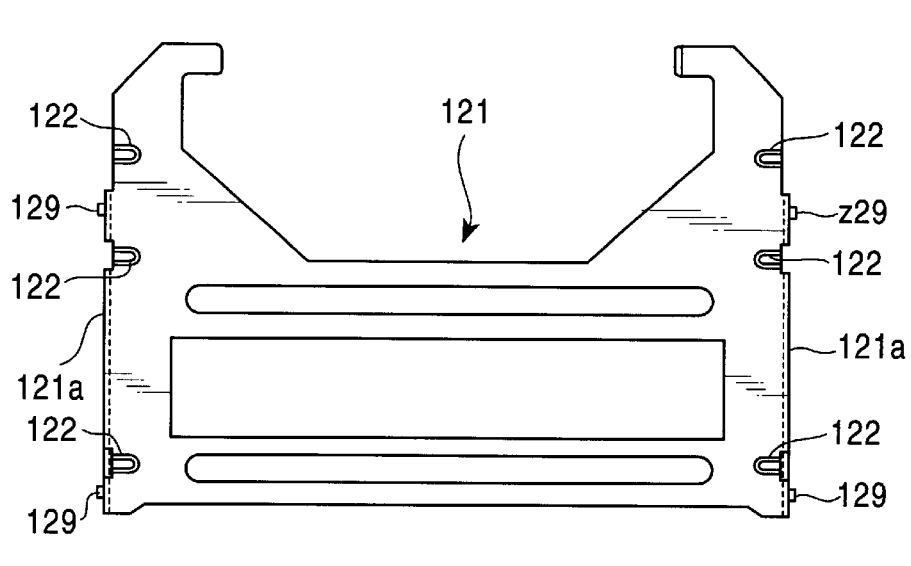
FIG. 24A is a plan view.
Figure 24C:
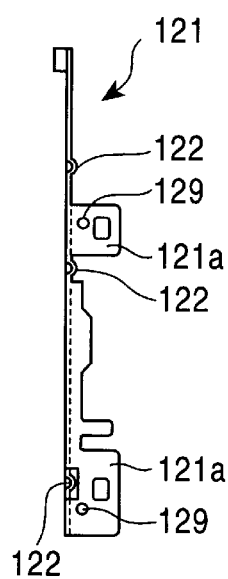
FIG. 24C is a front view each showing a cartridge presser member.
Figure 24B:
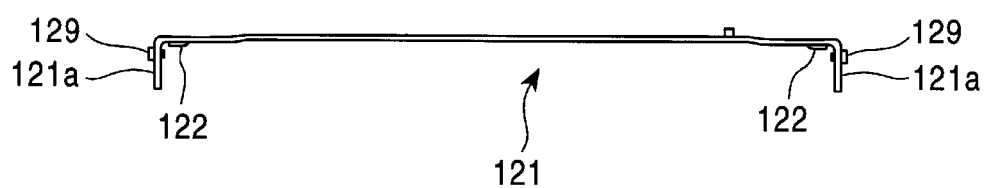
FIG. 24B is a side view.
Figure 25:
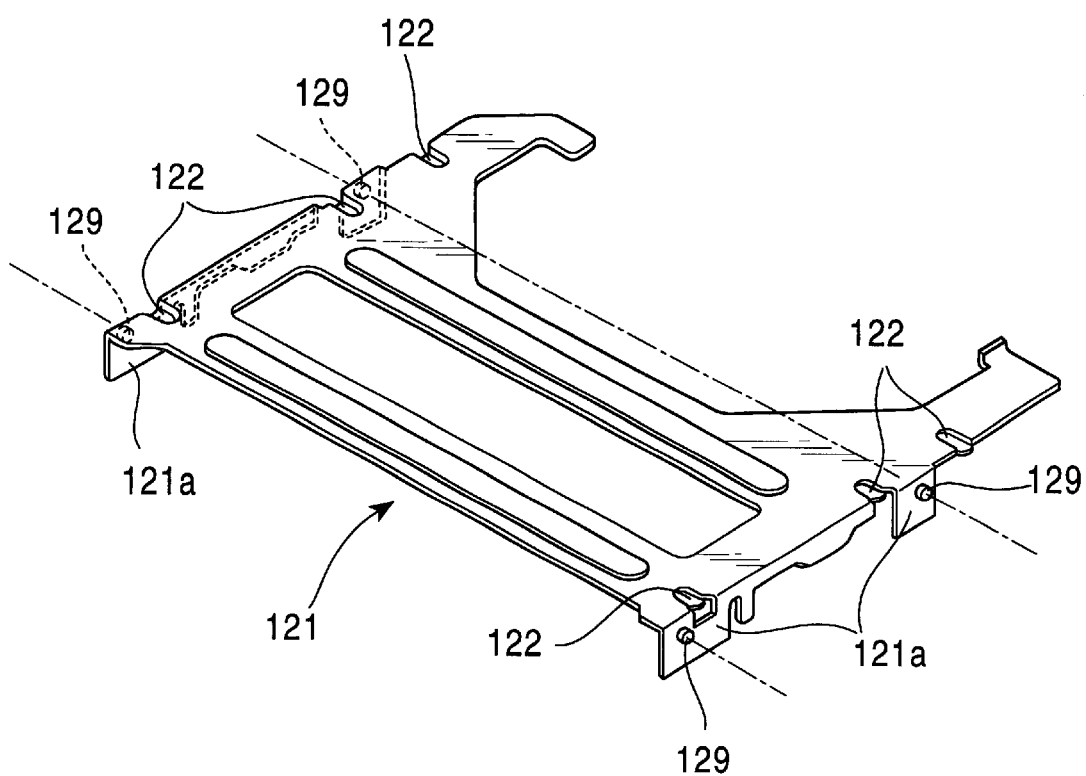
FIG. 25 is a perspective view of the cartridge presser member.

As shown in FIG. 32, the slide cam 101 is actuated into sliding in the direction of the arrow $h_1$ from the unloading position $P_{21}$ to the loading position $P_{22}$, whereby the cam 130 is separated from the cam follower pin 129 in the direction of the arrow $h_1$. Then, as shown in FIGS. 23 and 17, the slide plate 124 is actuated into sliding by the positioning springs 128 in the direction of the arrow $b_1$ from the unloading position $P_{41}$ to the loading position $P_{42}$ with respect to the cartridge insertion guide 50. The four cam follower pins 123 of the cartridge presser member 121 are pressed downward in parallel in the direction of the arrow $g_2$.

That is, the cartridge presser member 121 is lowered by the positioning springs 128 in a parallel motion from the upward position shown in FIG. 16 to the downward position shown in FIG. 17. The six cartridge-pressing projections 122 are brought into abutment with six corner portions of both sides 1c at the upper part 1e of the cartridge 1 from the direction of the arrow $g_2$, and the cartridge 1 is pressed downward in parallel in the direction of the arrow $g_2$. The bottom 1a of the cartridge 1 is pressed parallel into attachment to the upper portions of the height-controlling bases 120 and the height-controlling pins 119 by resilient forces of the positioning springs 128, and is positioned with high accuracy. In this case, since the positioning springs 128 are arranged on both sides of the cartridge insertion guide 50 in the direction parallel to the direction of insertion of the cartridge, a sufficiently long effective stroke of the positioning spring 128 can be secured while achieving a reduction in thickness of the optical disc apparatus 10, and resilient force of the spring for positioning the cartridge 1 can be effectively exerted.

When the optical disc 5 is unloaded after the information is recorded on and/or reproduced from the optical disc 5, the operation for loading the optical disc 5 is reversed. The slide cam 101 of the disc loading device 100 is slidingly returned in the direction of the arrow $h_2$ from the loading position $P_{22}$ to the unloading position $P_{21}$ shown in FIG. 32, whereby the mechanical deck 91 is moved downward in the direction of the arrow $g_2$ from the upward position shown in FIG. 8 to the downward position shown in FIG. 7. Therefore, the reference pins 118 are drawn out of the cartridge 1 in the direction of the arrow $g_2$. The slide plate 124 is slidingly returned again by the cam 130 of the slide cam 101 against the positioning springs 128 in the direction of the arrow $b_2$ from the loading position $P_{42}$ shown in FIG. 17 to the unloading position $P_{41}$ shown in FIG. 16. The cartridge presser member 121 is returned upward by a parallel motion in the direction of the arrow $g_1$ from the downward position shown in FIGS. 19 and 21 to the upward position shown in FIGS. 18 and 20.

(7) Emergency Ejection Device

An emergency ejection device 135 will now be described with reference to FIGS. 26 to 35.

The emergency ejection device 135 is intended to manually eject the cartridge 1 out of the optical disc apparatus 10 when an emergency occurs such that power is suddenly shut down due to a power failure, or the like, in the middle of loading the cartridge 1 and recording and/or reproducing information on and/or from the optical disc 5 to be described below.

The emergency ejection device 135 includes two clutches 136, 137 provided in the middle of the driving paths of the cartridge retracting motor 70 and the disc loading motor 106, respectively, an emergency ejection-operating lever 148 for switching the clutches 136, 137 from an engaged to a disengaged state, and ejection means for ejecting the cartridge 1 to the outside of the cartridge insertion slot 13 from the cartridge insertion guide 50 when the clutches 136, 137 are switched to the disengaged state.

The clutches 136, 137 adopt a structure such that clutch gears 138, 139 arranged in gear trains 75, 110 constituting driving paths of the cartridge retracting motor 70 and the disc loading motor 106, respectively, are brought into and out of engagement with input-side gears and/or output-side gears of the clutch gears 138, 139. The clutch gear 138 of the clutch 136 is constructed into an intermediate gear so as to be brought into and out of engagement with another intermediate gear 140 arranged on the output side in the gear train 75, and the clutch gear 139 of the clutch 137 is constructed so as to bring the pinion 111 of the output end of the gear train 110 into and out of engagement with the rack 112 (hereinafter, the pinion 111 is referred to as the clutch gear 139). The clutch gears 138, 139 are movable up and down in the directions of the arrows $j_1$, $j_2$ along supporting shafts 141, 142 thereof, and are biased to the lower position to be meshed with the intermediate gear 140 and the rack 112 by clutch springs 143, 144 each consisting of a compression spring mounted on the periphery of the supporting shafts 141, 142. The supporting pins 141, 142 are vertically supported at both of their ends between the cartridge insertion guide 50 and a gear train support plate 145, and between the resin chassis 20 and a gear train support plate 146, respectively.

The emergency ejection-operating lever 148 is formed of a sheet metal. The emergency ejection-operating lever 148 is composed of a sliding member slidably mounted along the gear train 75 side lower portion of the main body 51 of the cartridge insertion guide 50 via a plurality of guide pins 149 and guide slots 150 in the directions of the arrows $b_1$, $b_2$. The emergency ejection-operating lever 148 is slidingly biased in the direction of the arrow $b_2$ by an operating lever spring 151 stretched between the operating lever 148 and the main body 51 of the cartridge insertion guide 50. A clutch cam 153 made of synthetic resin is mounted on the lower end of the clutch gear 138 of the clutch 136. The clutch cam 153 is a cam means that is inserted through an insertion hole 152 formed in the main body 51 and is moved up and down together with the clutch gear 138 in the directions of the arrows $j_1$, $j_2$ along the supporting shaft 141. The clutch cam 153 is mounted on the outer periphery of the supporting shaft 141 by a boss 153a so as to be slidable in the directions of the arrows $j_1$, $j_2$, and the clutch gear 138 is rotatably mounted on the outer periphery of the boss 153a. An operating portion 154 for operating the clutch cam 153 is formed on the rear end of the emergency ejection-operating lever 148.

An operating portion 155 made of synthetic resin for operating the clutch gear 139 of the clutch 137 is fixed to the front end of the emergency ejection-operating lever 148. A conversion lever 156 made of synthetic resin is mounted on the bottom plate 20a of the resin chassis 20 below the operating portion 155 so as to be rotatable in the directions of the arrows $k_1$, $k_2$ via the supporting pin 157. The conversion lever 156 is rotationally biased in the direction of the arrow $k_2$ by a conversion lever spring 158 that is stretched between the lever 156 and a spring retainer 166 integrally formed with the bottom plate 20a, and abuts with a stopper 159 integrally formed on the bottom plate 20a to be stopped. A clutch cam 160 made of synthetic resin is mounted on the lower end of the clutch gear 139 of the clutch 137. The clutch cam 160 is mounted so as to be moved upward together with the clutch gear 139 in the directions of the arrows $j_1$, $j_2$ along the supporting shaft 142 thereof, and the clutch gear 138 is rotatably mounted on the outer periphery of a boss 160a thereof. The conversion lever 156 includes an operating portion 161 operated by the operating portion 155, an operating portion 162 for operating the clutch cam 160, and an operating portion 163 for operating the slide cam 101. The operating portions 161, 162, and 163 are integrally molded. A recess 164 formed in the shape of a truncated cone is formed in the front end surface of the operating portion 155 so as to oppose just behind the emergency ejection-operating hole 15.

Figure 27:
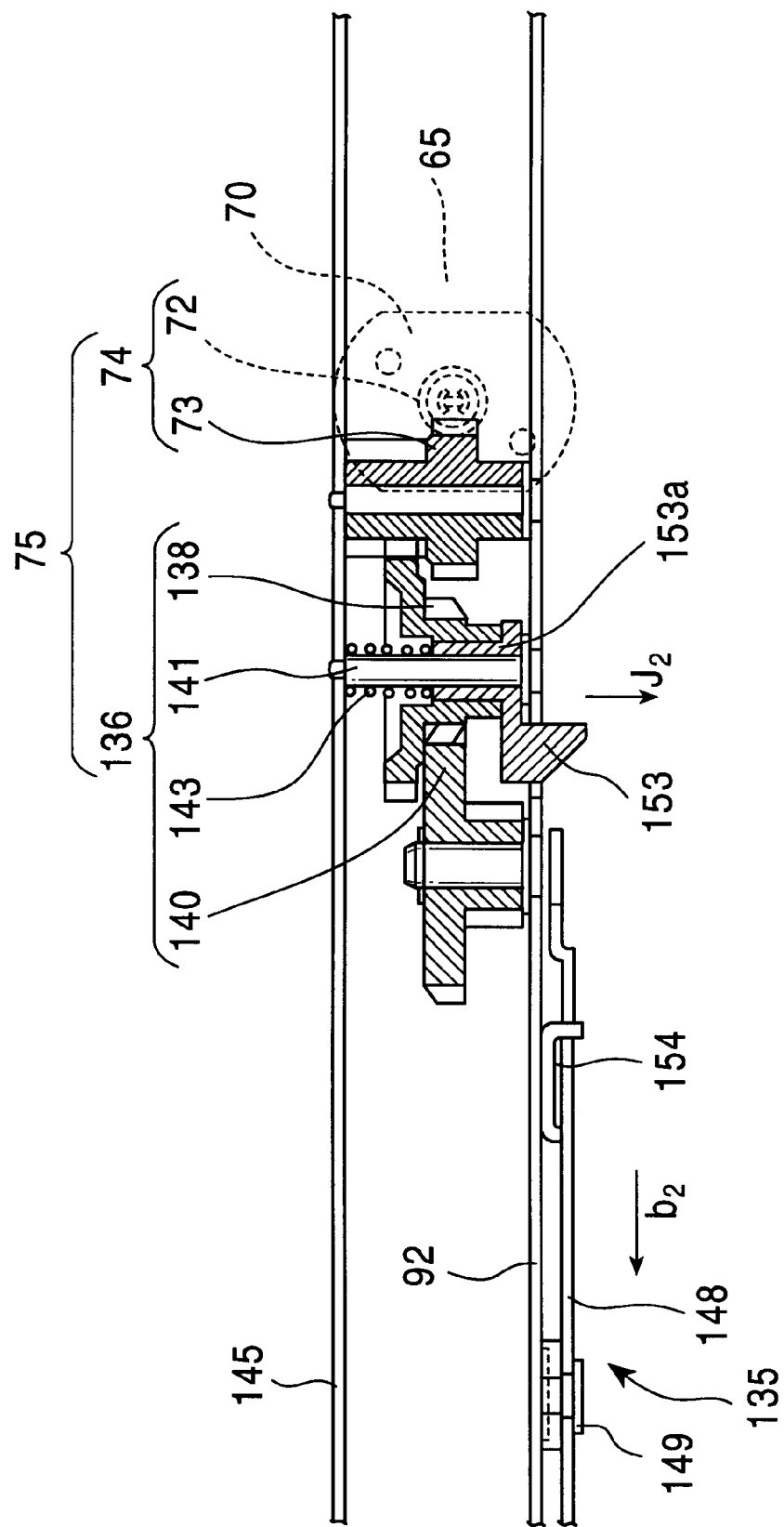
FIG. 27 is a cross-sectional view showing an engaged state of a clutch provided in a driving path of a cartridge retracting motor of the emergency ejection device.
Figure 30:
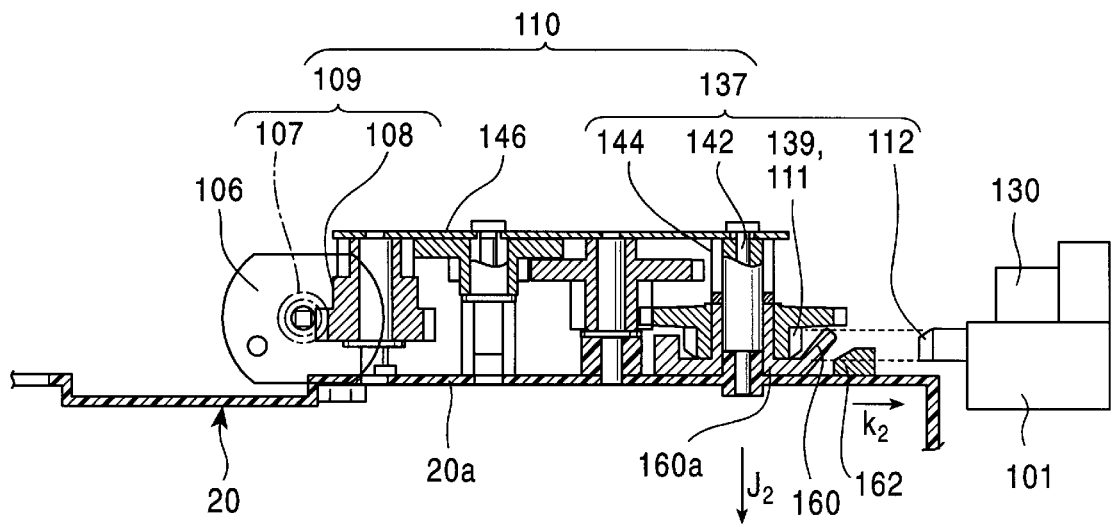
FIG. 30 is a sectional developed view showing an engaged state of a clutch provided in a driving path of the disc loading motor.
Figure 33:
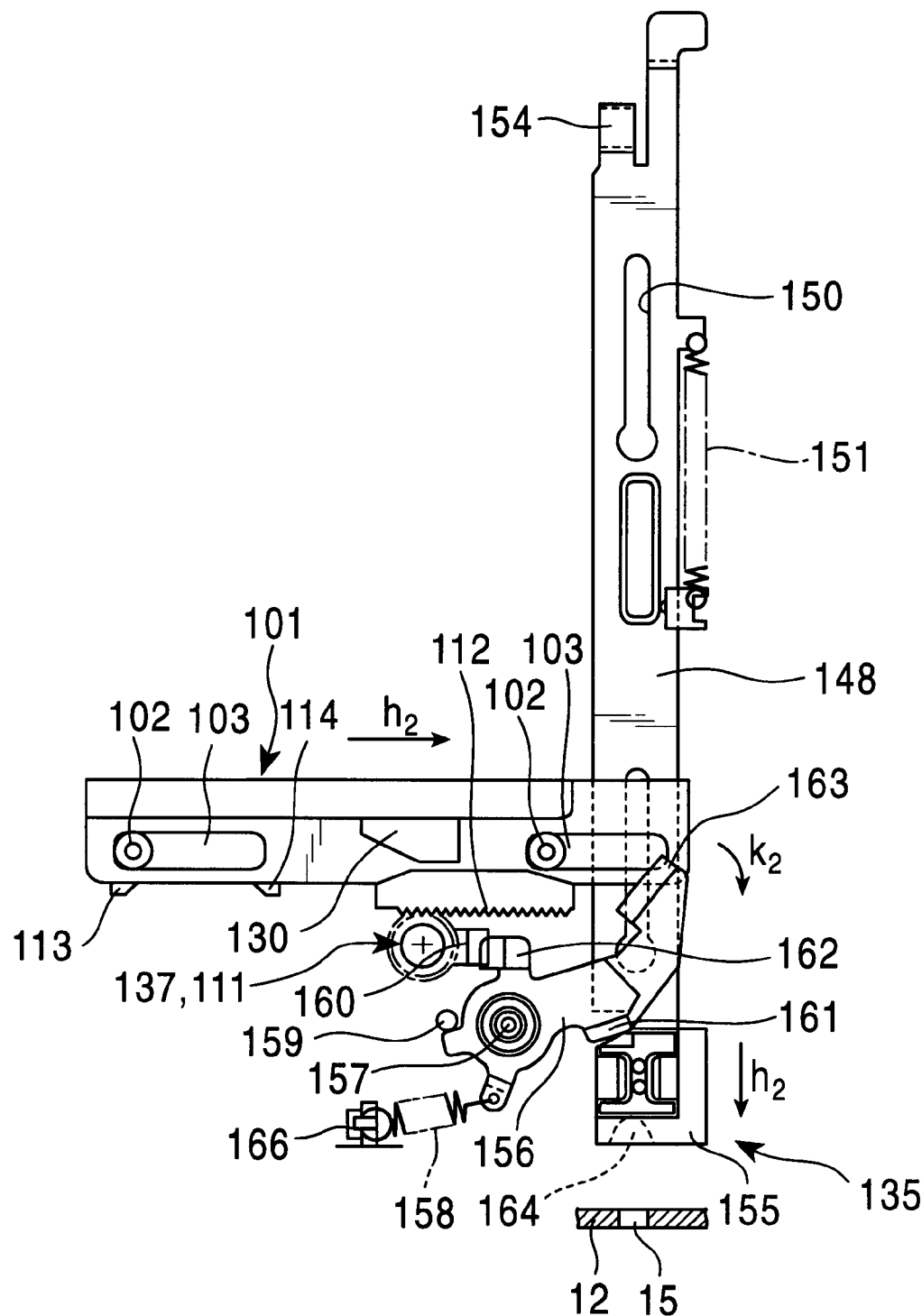
FIG. 33 is a top view showing a state in which an emergency ejection-operating lever, the conversion lever, and the slide cam are returned to the original positions, respectively.

In a normal state, the emergency ejection-operating lever 148 is slidingly returned by the operating lever spring 151 in the direction of the arrow $b_2$, as shown in FIG. 33, and the operating portion 154 is separated from the clutch cam 153 of the clutch gear 138 in the direction of the arrow $b_2$, as shown in FIG. 27. Therefore, the clutch gear 138 is moved downward by a clutch spring 143 in the direction of the arrow $j_2$ to the downward position to be meshed with the intermediate gear 140, so that the clutch 136 is engaged. In addition, the emergency ejection-operating lever 148 is slidingly returned in the direction of the arrow $b_2$, as shown in FIG. 33, whereby the conversion lever 156 is rotationally returned by the conversion lever spring 158 in the direction of the arrow $k_2$ to abut with the stopper 159, and the operating portion 162 is separated from the clutch cam 160 of the clutch gear 139 in the direction of the arrow $k_2$, as shown in FIG. 30. Therefore, the clutch gear 139 is moved downward by a clutch spring 144 in the direction of the arrow $j_2$ to the downward position to be meshed with the rack 112, so that the clutch 136 is also engaged. Furthermore, the conversion lever 156 is rotationally returned in the direction of the arrow $k_2$, whereby the operating portion 163 is moved away in the direction of the arrow $k_2$ to a position not to interfere with the slide cam 101, as shown in FIG. 33.

Figure 28:
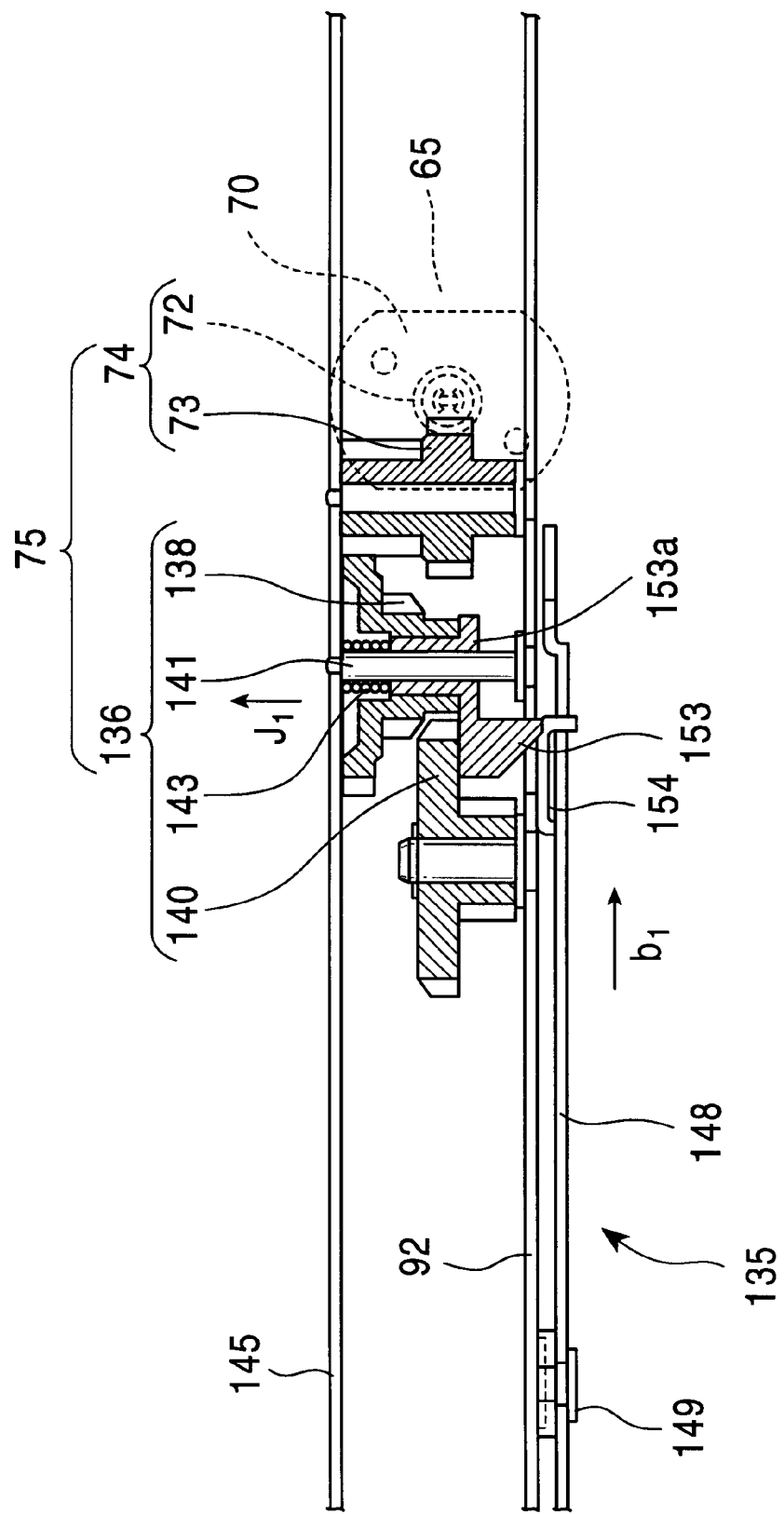
FIG. 28 is a cross-sectional view showing a disengaged state of the clutch of FIG. 27.
Figure 29:
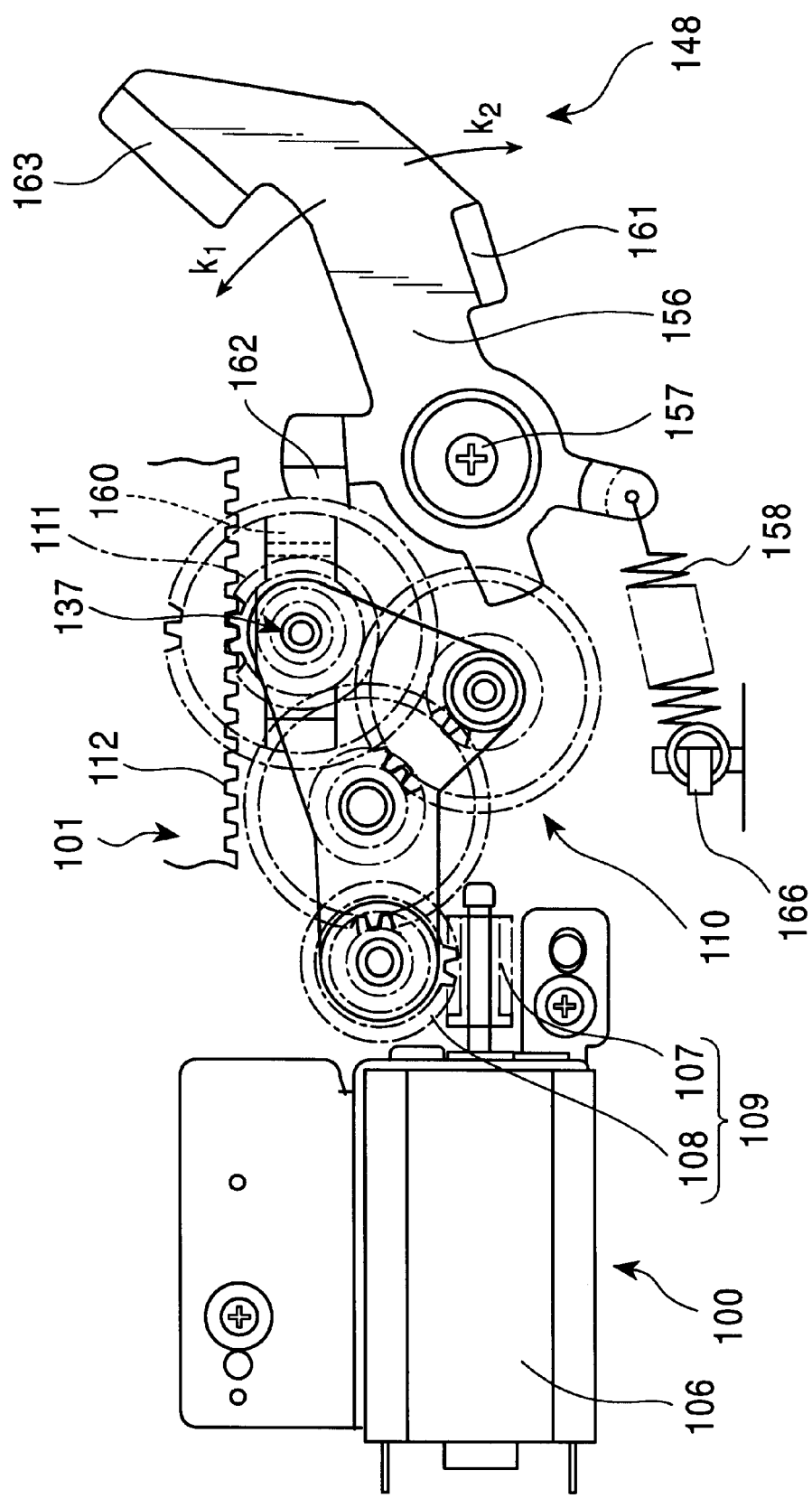
FIG. 29 is a plan view showing a driving path of a disc loading motor of a disc loading device, and a conversion lever of the emergency ejection device.
Figure 34:
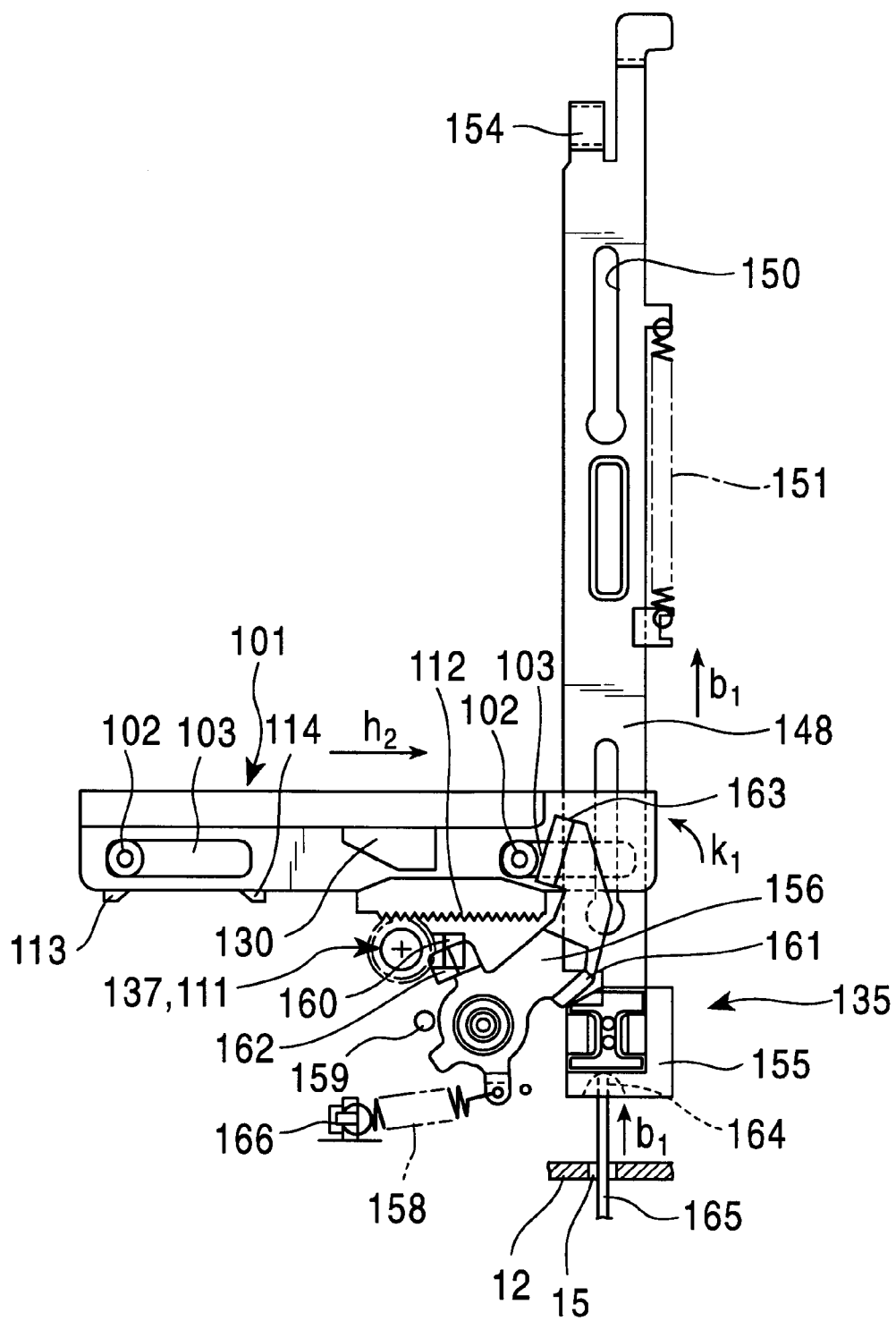
FIG. 34 is a top view illustrating the start of the operation of the conversion lever and the slide cam by the emergency ejection-operating lever.
Figure 35:
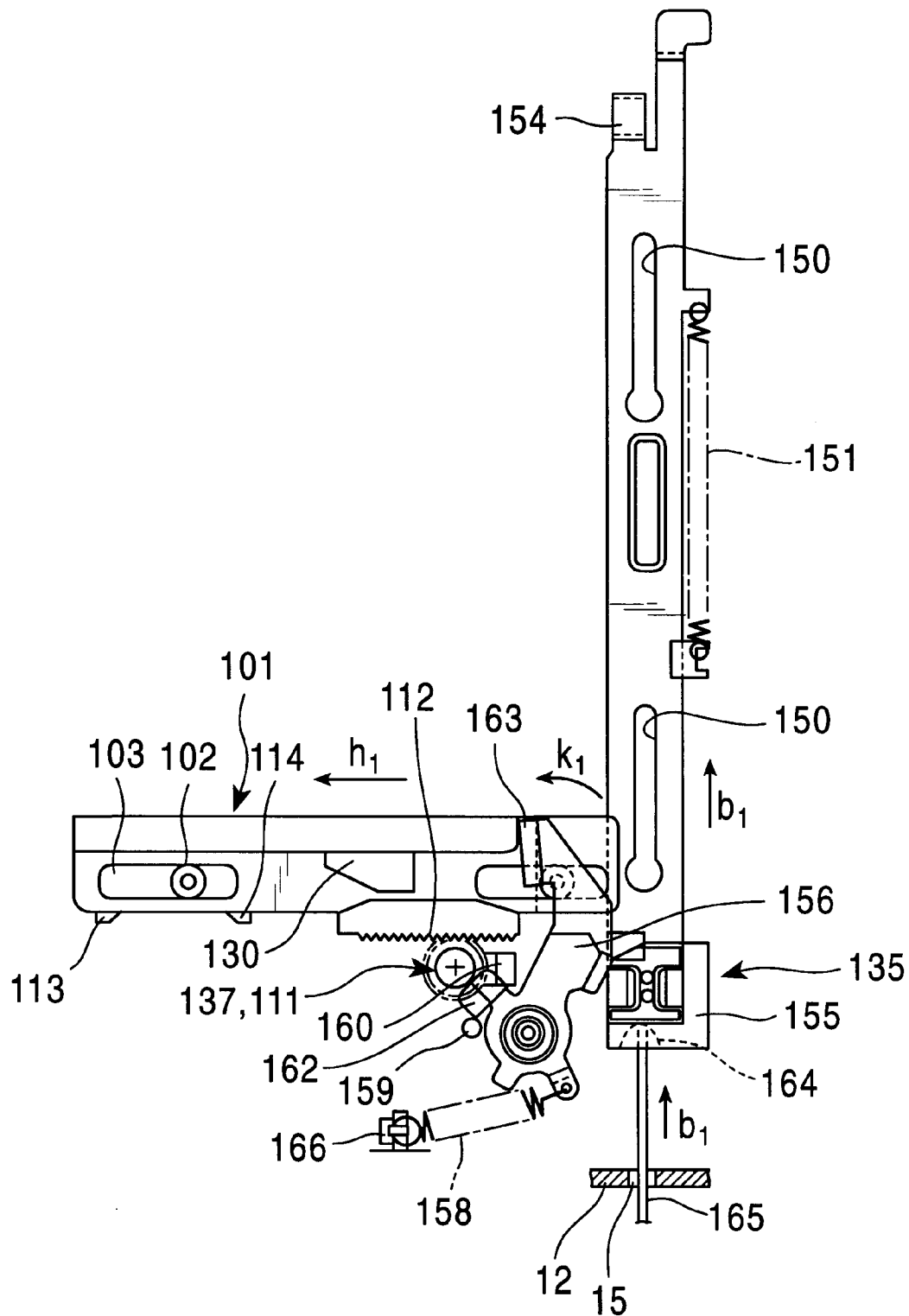
FIG. 35 is a top view illustrating the completion of the operation of the conversion lever and the slide cam by the emergency ejection-operating lever.

When operating the emergency ejection, as shown in FIGS. 34 and 35, an emergency ejection-operating rod 165, such as a wire, is inserted into the operating hole 15 in the direction of the arrow $b_1$ from the outside of the front panel 12 of the optical disc apparatus 10, and the distal end thereof is stuck into the recess 164 to slide the emergency ejection-operating lever 148 against the operating lever spring 151 in the direction of the arrow $b_1$ to a clutch disengagement position shown in FIG. 35. Then, as shown in FIG. 28, the operating portion 154 on the rear end of the emergency ejection-operating lever 148 is pressed by the clutch cam 153 from the direction of the arrow $b_1$. The clutch cam 153 is pushed upward in the direction of the arrow $j_1$ along the supporting shaft 141 against the clutch spring 143 due to its own cam action, i.e., sliding guide action. The clutch gear 138 is pushed upward together with the clutch cam 153 in the direction of the arrow $j_1$ to an upward position to be disengaged from the intermediate gear 140, so that the clutch 136 is switched to the disengaged state.

Figure 31:
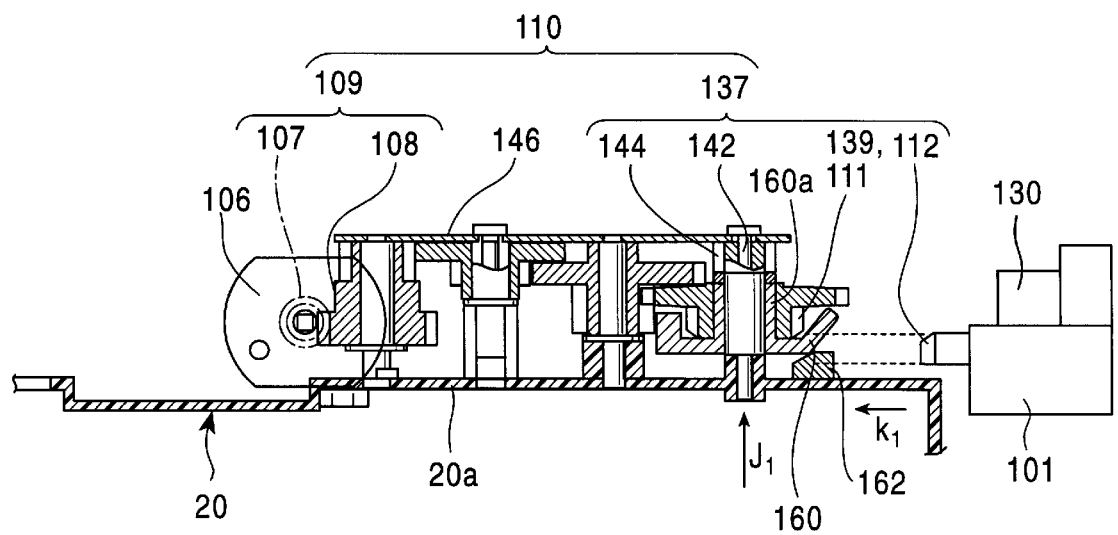
FIG. 31 is a sectional developed view showing a disengaged state of the clutch of FIG. 30.

In this case, as shown in FIGS. 34 and 35, the operating portion 151 of the emergency ejection-operating lever 148 pushes the operating portion 161 of the conversion lever 156 in the direction of the arrow $b_1$ to rotate the conversion lever 156 about the supporting pin 157 in the direction of the arrow $k_1$ against the conversion lever spring 158. Then, the conversion lever 156 is rotated in the direction of the arrow $k_1$ to the clutch disengagement position shown in FIG. 35, and the operating portion 162 of the conversion lever 156 is pressed by the clutch cam 160 from the direction of the arrow $k_1$, so that the clutch cam 160 is pushed upward in the direction of the arrow $j_1$ along the supporting shaft 142 against the clutch spring 144 due to its own sliding guide action, as shown in FIG. 31. The clutch gear 139 is pushed upward together with the clutch cam 160 in the direction of the arrow $j_1$ to an upward position to be disengaged from the rack 112, so that the clutch 137 is also switched to the disengaged state.

In addition, in this case, as shown in FIGS. 34 and 35, the operating portion 163 of the conversion lever 156 abuts against one end of the slide cam 101 from the direction of the arrow $k_1$ to slidingly actuate the slide cam 101 in the direction of the arrow $k_2$ from the loading position $P_{22}$ to the unloading position $P_{21}$. Then, as described above, the mechanical deck 91, actuated downward in the direction of the arrow $g_2$ from the upward position shown in FIG. 8 to the downward position shown in FIG. 7, and the disc table 97 and the reference pins 118 are lowered from the cartridge 1, so that the cartridge 1 can be ejected.

Since the cartridge 1 is automatically ejected by resilient forces of the ejecting spring 60 of the shutter actuating lever 57 and the ejecting spring 80 of the cartridge retraction device 65 in the direction of the arrow $b_2$ from the retraction end position $P_{13}$ to the retraction start position $P_{12}$ shown in FIG. 5, the cartridge 1 can be drawn out of the optical disc apparatus 10 by picking up the rear end 1d of the cartridge 1 outside the cartridge insertion slot 13. In this case, as shown in FIGS. 5, 12, and 13, the cartridge 1 is ejected in the direction of the arrow $b_2$ in such a manner that the front end 1b of the cartridge 1 is pushed in the direction of the arrow $b_2$ by the shutter actuating lever 57 that is rotationally returned by the ejecting spring 60 in the direction of the arrow $c_2$ and the slider 68 is slidingly returned in the direction of the arrow $b_2$ via the interlocking projection 81 by the interlocking hole 82 of the rotary lever 69 that is rotationally returned in the direction of the arrow $d_2$ by the ejecting spring 80, and that the front end 1b of the cartridge 1 is also pushed by the hook 67 in the direction of the arrow $b_2$.

(8) Head Transfer Device

A head transfer device 170 will now be described with reference to FIGS. 6 and 36 to 42.

Figure 36:
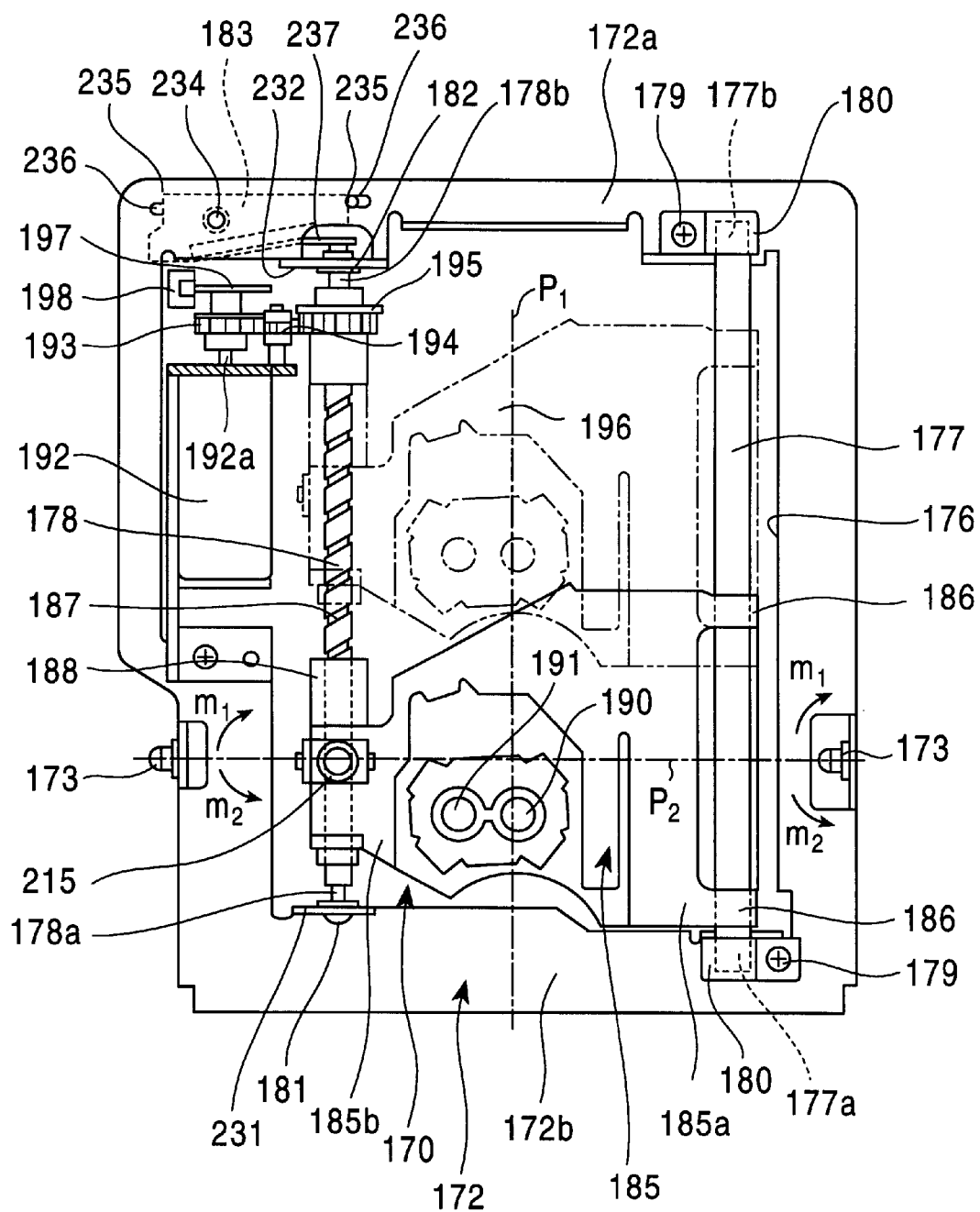
FIG. 36 is a plan view illustrating a head transfer device.

As shown in FIG. 6, a relatively large opening 171 is formed along the spindle and the head center $P_1$ to the rear of a mounted position of the spindle motor 95, and a skew adjustment base 172 formed of a sheet metal, shown in FIG. 36, is horizontally arranged below the opening 171. The skew adjustment base 172 is mounted so as to be rotatable in the directions of the arrows $m_1$, $m_2$ about a pair of horizontal supporting pins 173 arranged below the mechanical deck 91 on a horizontal skew adjustment axis $P_2$ that is perpendicular to the spindle and the head center $P_1$, and a skew adjustment device 175 comprising a skew adjusting motor 174 for rotationally adjusting the skew adjustment base 172 in the direction of the arrows $m_1$, $m_2$ is mounted on the rear end 91a of the mechanical deck 91.

As shown in FIGS. 36 to 42, a relatively large opening 186 along the spindle and the head center $P_1$ is also formed in the skew adjustment base 172, and a guide shaft 177 and a lead screw 178 are detachably mounted on the skew adjustment base 172 at both sides of the opening 176. The guide shaft 177 and the lead screw 178 are made of metal, such as stainless steel. Both front and rear ends 177a, 177b of the guide shaft 177 are fixed on the skew adjustment base 172 by a pair of positioning members 180 that are accurately secured on the skew adjustment base 172 by a pair of set screws 179, so that the guide shaft 177 is mounted completely parallel to the spindle and the head center $P_1$ with high accuracy. Both front and rear ends 178a, 178b of the lead screw 178 are mounted on the skew adjustment base 172 so as to be inserted and extracted using a pair of thrust bearings 181, 182, and a plate spring 183.

A head transfer base 185 is horizontally arranged between the guide shaft 177 and the lead screw 178, and a pair of cylindrical thrust receivers 186 formed on both front and rear ends of one end portion 185a of the head transfer base 185 are slidably inserted into the outer periphery of the guide shaft 177 in the directions of the arrows $b_1$, $b_2$. A lead groove 187 is formed spirally on the outer periphery of the lead screw 178, and a completely cylindrical-shaped nut 188 made of metal or wear-resistant synthetic resin is slidably inserted into the outer periphery of the lead screw 178 in the directions of the arrows $b_1$, $b_2$. A lead rib 189 integrally spirally formed on the inner periphery 188a of the nut 188 is slidably engaged with the lead groove 187 over a circumferential long area. The other end portion 185b of the head transfer base 185 is mounted on the nut 188 via a two-axis universal joint 210 and a tangential skew adjuster 215 to be described below.

An object lens 190 for a DVD (digital versatile disc) and an object lens for a CD (compact disc) are mounted vertically upward on the head transfer base 185 by two-axis actuators (not shown), respectively. An optical pickup (not shown) for selectively irradiating the objective lenses 190, 191 with a laser beam and receiving a reflected light of the laser beam is incorporated into the head transfer base 185. A head transferring motor 192 is mounted aside the lead screw 178 on the skew adjustment base 172 in parallel with the lead screw 178, and a follower gear 195 actuated into rotation via an intermediate gear 194 by a motor gear 193 fixed to a motor shaft 192a of the head transferring motor 192 is press-fitted and fixed to the outer periphery of the lead screw 178 on the side of the rear end 178b. A cylindrical elastic stopper 196 formed of an elastic material, such as rubber is press-fitted to the forward side of the follower gear 195 on the outer periphery of the lead screw 178. A slit disc 197 fixed to the rear end of the motor shaft 192a and a photocoupler 198 mounted on the skew adjustment base 172 constitute an encoder of the head transferring motor 192.

When the mechanical deck 91 is moved upward by the disc loading device 100 in the direction of the arrow $g_1$ to be locked at the upward position shown in FIG. 8, the guide shaft 177 and the lead screw 178 are brought level, and the objective lenses 190, 191 on the head transfer base 185 are inserted into the bottom opening 6 of the cartridge 1 from below to be brought near the lower surface of the optical disc 5. The lead screw 178 is actuated into rotation in the forward and reverse directions by the head transferring motor 192 via the motor gear 193, the intermediate gear 194, and the follower gear 195 in a state in which the laser beam selectively irradiated by the optical pickup onto the objective lenses 190, 191 is focused to the optical disc 5 from below, whereby the head transfer base 185 is moved in the directions of the arrows $b_1$, $b_2$ along the guide shaft 177 by a screw-feed action of the lead screw 178 and the nut 188. The data of the optical disc 5 is recorded and/or reproduced while seeking the laser beam along the spindle and head center $P_1$.

In this case, the nut 188 is inserted into the outer periphery of the lead screw 178, and the lead rib 189 is engaged with the lead groove 187 over a long circumferential area. Thus, unlike a conventional device in which a needle or a half nut is engaged with the lead screw 178 by means of a plate spring, there is no risk of accidental removal of the lead rib 189 from the lead groove 187 by inertia of the head transfer base 185 generated when the lead screw 178 is actuated into rotation by the head transferring motor 192 at high speed in the forward and reverse directions to reversely transfer the head transfer base 185 in the directions of the arrows $b_1$, $b_2$. Therefore, the lead screw 178 can be comfortably actuated into rotation at high speed, and a high-speed seeking of the laser beam can be effected by the objective lens 190, 191. In addition, since the nut 188 is engaged with the lead groove 187 by means of the lead rib 189 over a long circumferential area, the friction load of the lead groove 187 and the lead rib 189 with high-speed rotation of the lead screw 178 becomes very small, and high wear-resistance of the lead screw 178 and the nut 188 is obtained, so that durability of the head transfer device 170 is remarkably increased. The elastic stopper 196 serves as a cushion when the head transfer base 185 violently moves in the direction of the arrow $b_1$.

(9) Backlash Eliminator of a Nut

A backlash eliminator 200 of the nut 188 will now be described with reference to FIGS. 37 to 41.

In order to smoothly screw-feed the nut 188 by engaging the lead rib 189 of the nut 188 with the lead groove 187 of the lead screw 178, it is necessary to form the width of the lead rib 189 narrower than the width of the lead groove 187 so as to have a little backlash between the lead groove 187 and the lead rib 189 in the directions of the arrows $b_1$, $b_2$. The backlash, however, causes the head transfer base 185 to rattle greatly due to the inertia generated when seeking the head transfer base 185 at high speed in the directions of the arrows $b_1$, $b_2$ by the lead screw 178, and deteriorates accuracy of the high-speed seeking operation.

The head transfer device 170 eliminates the backlash of the nut 188 relative to the lead screw 178 in the directions of the arrows $b_1$, $b_2$.

That is, the backlash eliminator 200 employs a backlash-eliminating nut 200 formed of metal or wear-resistant synthetic resin, and a lead rib 202 is spirally integrally formed on the inner periphery 201a of the backlash-eliminating nut 201. A tapered surface 203 is formed on the outer periphery of an end portion of the backlash-eliminating nut 201 in the direction of the arrow $b_1$. The nut 188 is relatively long in the axial direction (in the direction of the arrow $b_2$), the lead rib 189 is formed on the inner periphery 188a of the nut 188 at an end portion 188b in the direction of the arrow $b_1$, and a four-way slitting 204 is formed in an end portion 188c in the direction of the arrow $b_2$.

Figure 41:
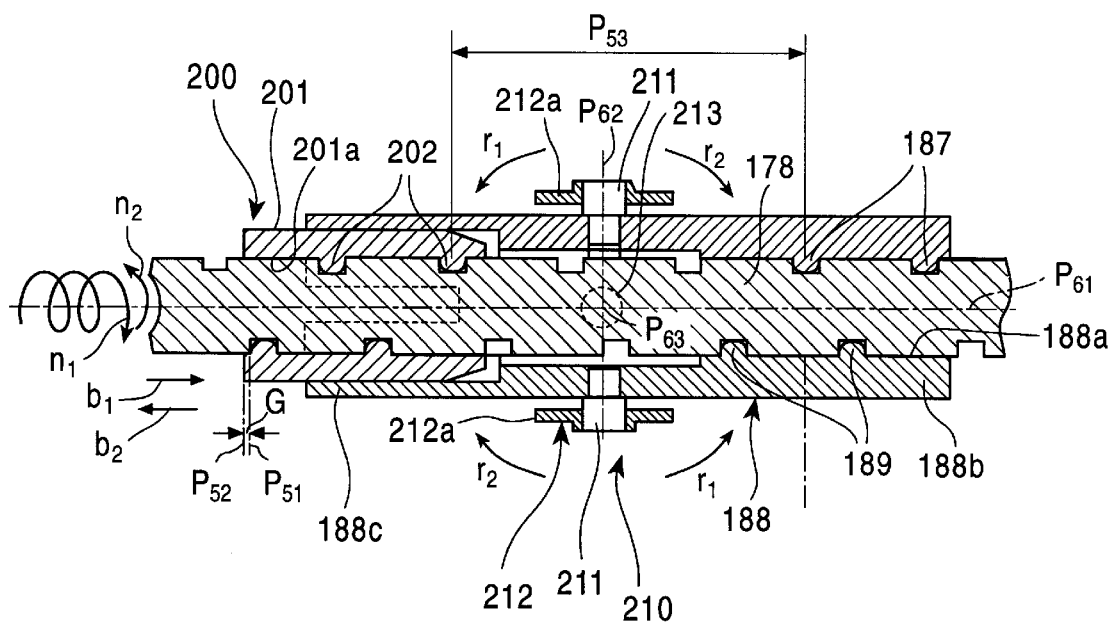
FIG. 41 is a sectional view illustrating a backlash eliminator of a nut with respect to the lead screw.

As shown in FIG. 41, the backlash-eliminating nut 201 is screwed into the end portion 188c of the nut 188 while being rotated in a clockwise direction (the direction of the arrow $n_1$) with the nut 188 and the backlash-eliminating nut 201 engaged with the lead groove 187. In this case, the backlash-eliminating nut 201 can be easily press-fitted into the end portion 188c of the nut 188 in such a manner that the slitting 204 formed in the end portion 188c of the nut 188 is expanded radially against elasticity by the tapered surface 203.

When the backlash-eliminating nut 201 is once screwed in the direction of the arrow $b_1$ into a maximum tightening position $P_{51}$ of the nut 188 and then, returned by 1° to 2° in a counterclockwise direction (the direction of the arrow $n_2$), the backlash-eliminating nut 201 is retracted in the direction of the arrow $b_2$ by several microns from the maximum tightening position $P_{51}$ to a retraction position $P_{52}$, so that a gap G of several micron order with respect to a pitch $P_{53}$ of the lead groove 189 is formed between inner opposing portions of the lead ribs 189, 202. In this state, both nuts 188 and 201 are used by being combined into one by an adhesive. As a result, the lead ribs 189, 202 can be engaged with the lead groove 187 with little backlash, the head transfer base 185 can be transferred without rattling in the directions of the arrows $b_1$, $b_2$ by actuating the lead screw 178 into rotation at high speed, and the high-speed seeking operation can be effected with high accuracy. Chamfers 205, 206 for use in engagement with a spanner to tighten these nuts 188, 201 are formed on the outer periphery of the nut 188 and the backlash-eliminating nut 201, respectively.

(10) Two-axis Universal Joint

A two-axis universal joint 210 will now be described with reference to FIGS. 36 to 38 and 41 to 43.

The two-axis universal joint 210 is intended to absorb the parallelism of the lead screw 178 with respect to the guide shaft 177 so that the head transfer base 185 is smoothly sought by the lead screw 178 at high speed along the guide shaft 177 in the directions of the arrows $b_1$, $b_2$.

In the two-axis universal joint 210, a pair of horizontal-rotation center pins 211 are provided by press-fitting or integral molding at both sides of substantially an axial center of the nut 188 on a horizontal center of rotation $P_{62}$ that is perpendicular to a lead screw center $P_{61}$, and a pair of legs 212a of a rotary base 212 each being formed of a plate spring into substantially a U-shape are rotatably mounted on the outer periphery of the horizontal-rotation center pins 211. A vertical-rotation center pin 213 is mounted on a top 212b of the rotary base 212 by caulking on a vertical center of rotation $P_{63}$ that is perpendicular to the lead screw center $P_{61}$, and an end portion 185b of the head transfer base 185 on the side of the nut 188 is rotatably mounted onto the outer periphery of the vertical-rotation center pin 213 via a tangential skew adjuster 215 to be described later.

Therefore, according to the two-axis universal joint 210, it is possible to freely rotate the lead screw 178 with respect to the head transfer base 185 about the horizontal-rotation center $P_{62}$ and the vertical-rotation center $P_{63}$ in the directions of the arrows $g_1$, $g_2$ and $r_1$, $r_2$. Therefore, even if the parallelism of the lead screw 178 relative to the guide shaft 177 gets strained due to deterioration with time, such as wear, of the both front and rear ends 178a, 178b of the lead screw 178, and the thrust bearings 181, 182 supporting the both ends 178a, 178b, the parallelism can be absorbed by the versatility of the perpendicular directions of the arrows $g_1$, $g_2$ and $r_1$, $r_2$. In other words, even if the parallelism of the lead screw 178 relative to the guide shaft 177 gets strained due to deterioration with time, the nut 188 can be smoothly screw-fed by the lead screw 178 in the directions of the arrows $b_1$, $b_2$, and the high-speed seeking operation of the head transfer base 185 in the directions of the arrows $b_1$, $b_2$ can be smoothly effected at all times.

(11) Tangential Skew Adjuster

Figure 42:
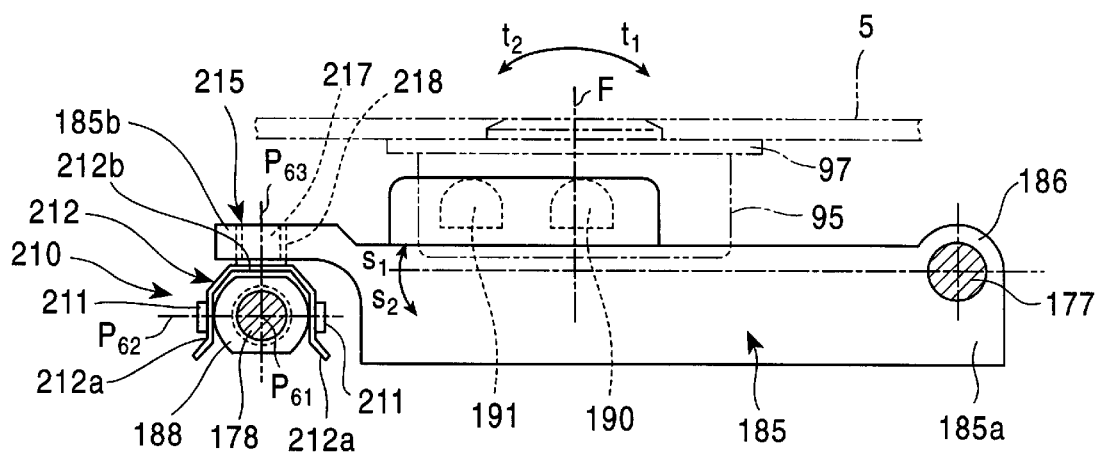
FIG. 42 is a front view illustrating a tangential skew adjuster.
Figure 43:
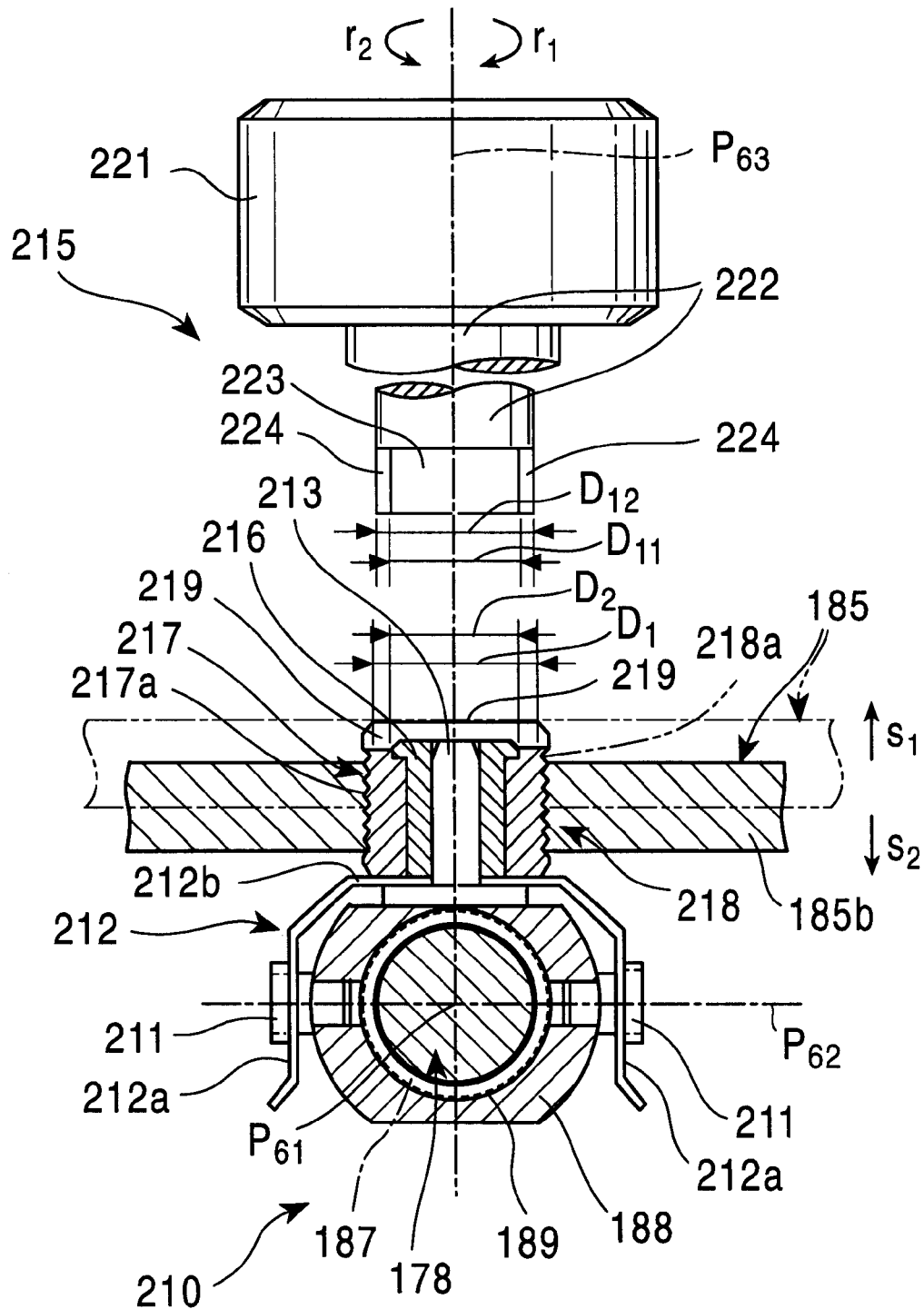
FIG. 43 is a sectional view illustrating a main part of the tangential skew adjuster and a two-axis universal joint.

The tangential skew adjuster 215 will now be described with reference to FIGS. 42 to 44.

The tangential skew adjuster 215 is intended to easily adjust a deviation of the verticality of the optical axes F of the objective lenses 190, 191 caused by a deviation of the verticality of the spindle motor 95 mounted on the mechanical deck 91.

In the tangential skew adjuster 215, a flanged sleeve 216 is fixed to the outer periphery of the vertical-rotation center pin 213 by press-fitting, and a screw cylinder 217 is rotatably mounted on the outer periphery of the flanged sleeve 216. In addition, a screw hole 218 is formed in the end portion 185b of the head transfer base 185 so as to pass vertically therethrough, and a male screw 217a formed on the outer periphery of the screw cylinder 217 is screwed into a female screw 218a formed on the inner periphery of the screw hole 218. A slot 219 is formed in the upper end of the screw cylinder 217 for the engagement with a jig.

Figure 44:
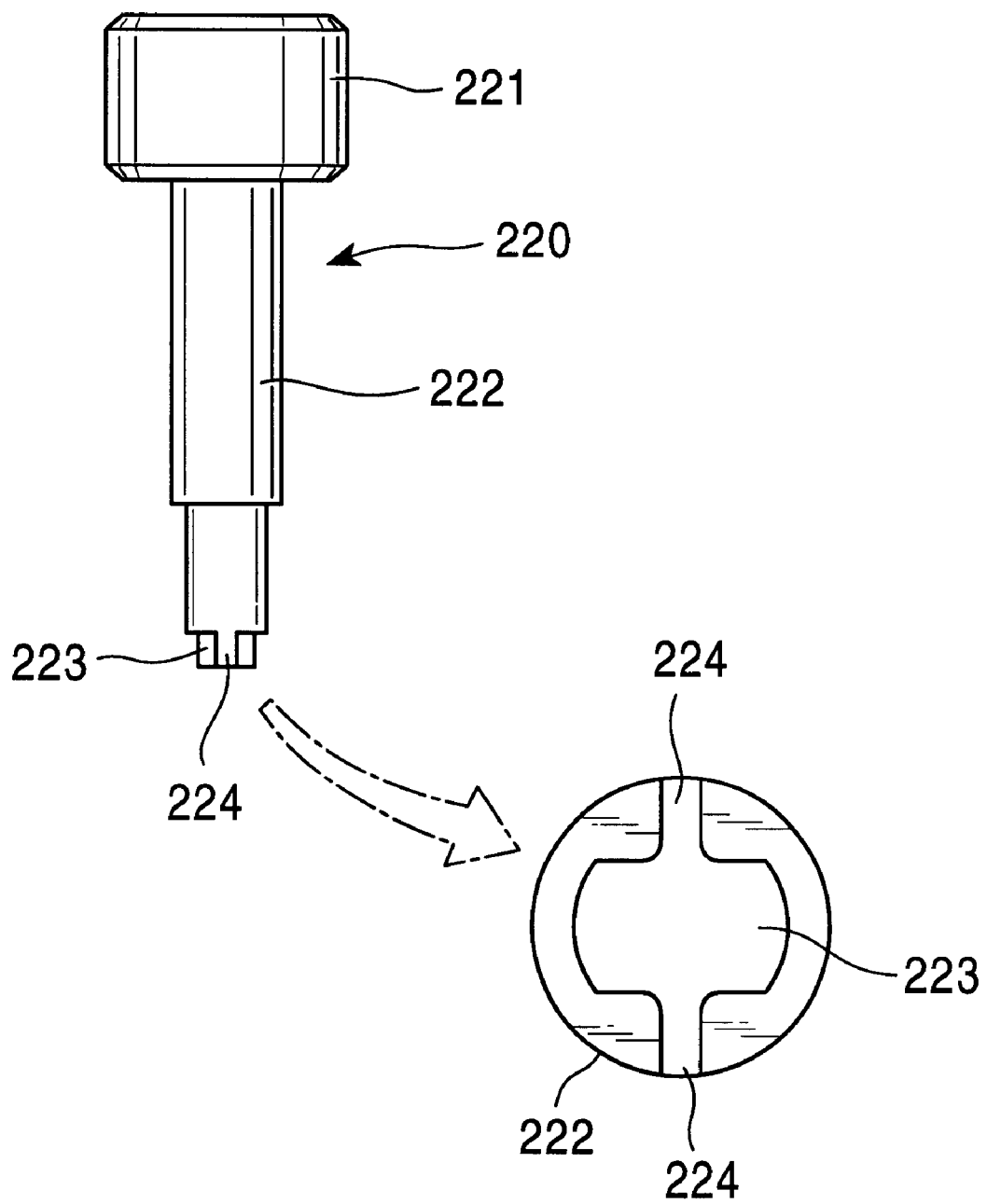
FIG. 44 illustrates a jig of the tangential skew adjuster.

The tangential skew adjuster 215 employs a jig 220 such as shown in FIG. 44. The construction of the jig 220 is such that a small-diameter column 223 having the outside diameter $D_{11}$ smaller than the inside diameter $D_1$ of the upper end of the screw cylinder 217 is integrally formed on the lower end of a columnar jig main body 222 with which a knob 221 is integrally formed, and a pair of projections 224 each having the outside diameter $D_{12}$ smaller than the inside diameter $D_2$ of the screw hole 218 and capable of being inserted into the slot 219 of the screw cylinder 217, are integrally formed on both sides of the outer periphery of the small-diameter column 223.

Therefore, according to the tangential skew adjuster 215, the projections 224 can be easily brought into engagement with the groove 219 by vertically inserting the small-diameter column 223 of the jig 220 into the screw cylinder 217 from above the head transfer base 185. When the knob 221 of the jig 220 is rotationally adjusted by fingers in the directions of the arrows $r_1$, $r_2$, the height of the end portion 185a of the head transfer base 185 can be adjusted by a screw-feeding operation of the female screw 218a effected by the male screw 217a, whereby the head transfer base 185 is rotationally adjusted about the guide shaft 177 in the directions of the arrows $S_1$, $S_2$. Then, the optical axes F of the objective lenses 190, 191 are inclined in the directions of the arrows $t_1$, $t_2$, i.e., the tangential radial directions, so that the verticality of the optical axes F with respect to the optical disc 5, i.e., a tangential skew, is adjusted. After the adjustment of the tangential skew, an adhesive is dropped into the screw hole 218 to fix the screw cylinder 217 into the screw hole 218.

(12) Mounting Device of a Lead Screw

Figure 37:
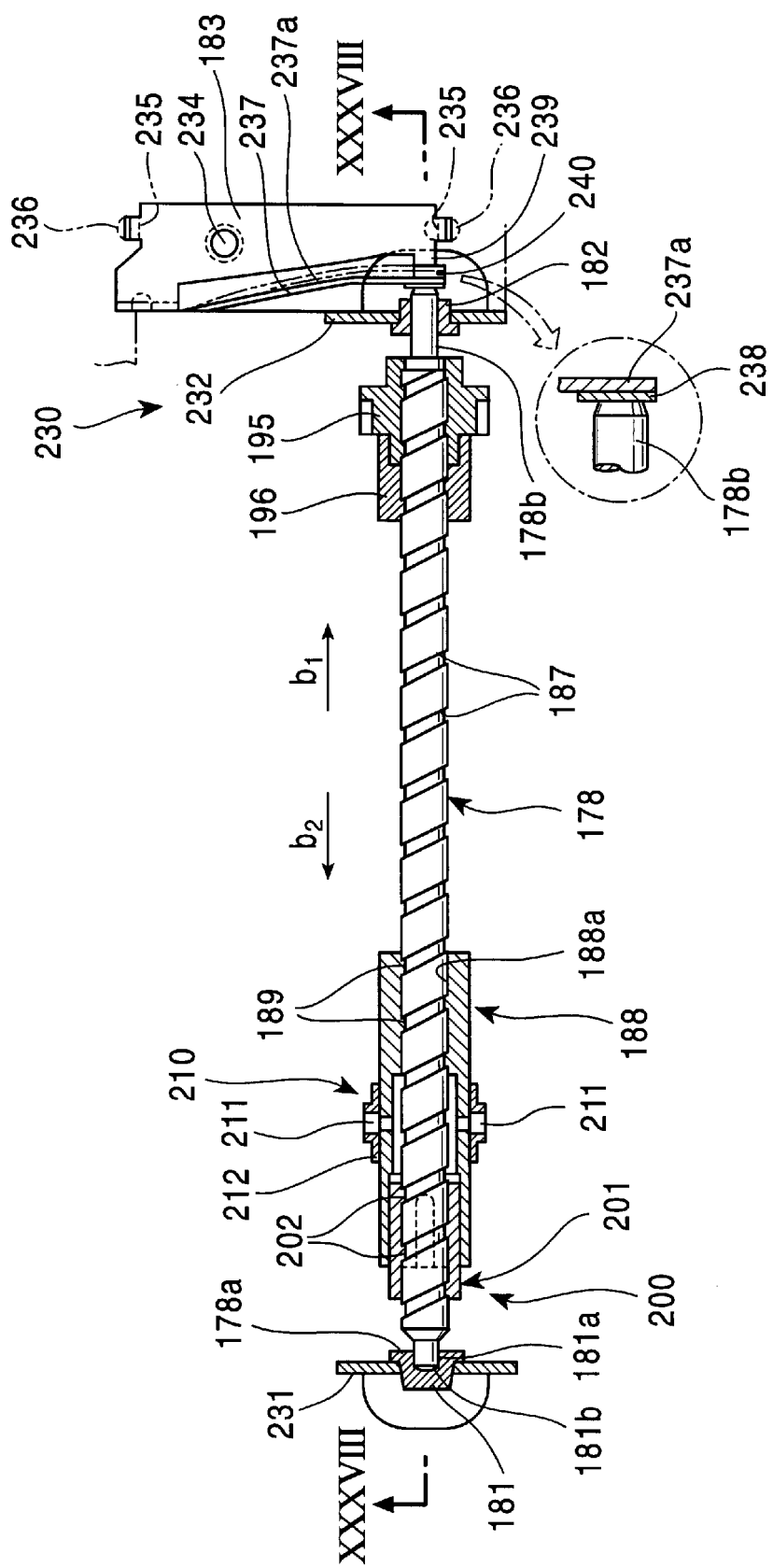
FIG. 37 is a sectional view illustrating a lead screw, a nut, and a lead screw mounting device of the head transfer device.
Figure 38:
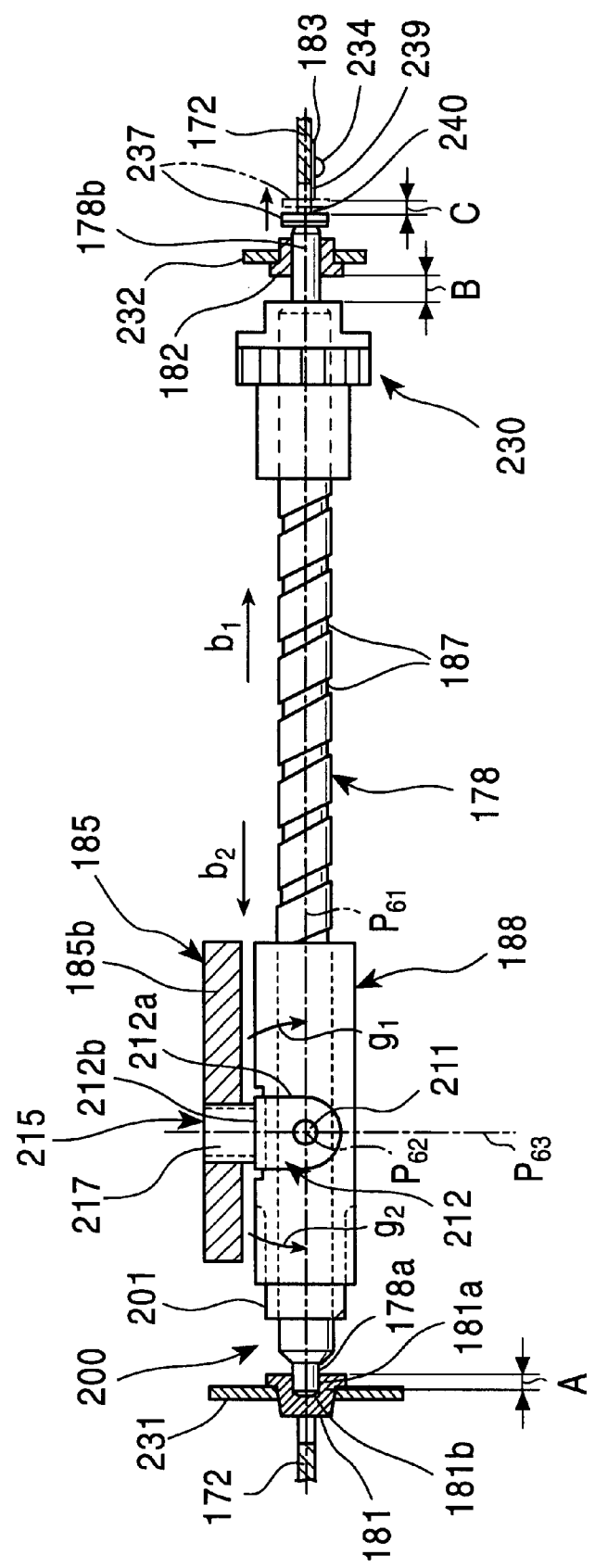
FIG. 38 is a sectional view taken along the line XXXVIII—XXXVIII of FIG. 37.
Figure 39A:
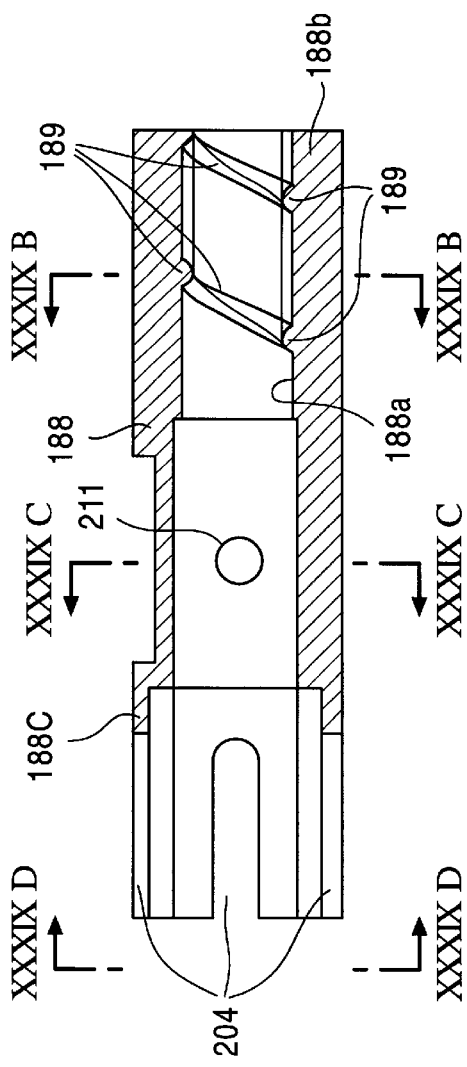
FIGS. 39A, 39B, 39C, and D are sectional views each illustrating the nut of FIG. 37.
Figure 39B:
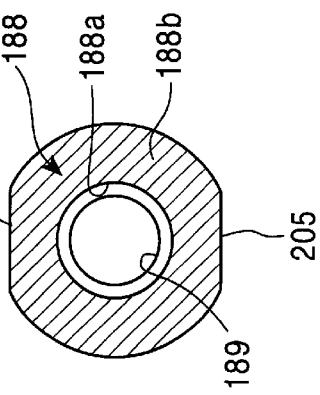
Figure 39C:
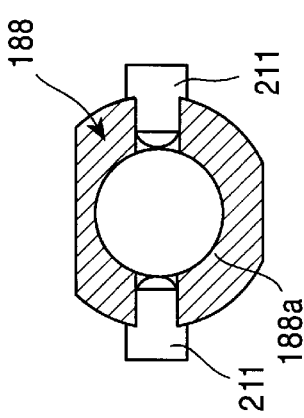
Figure 39D:
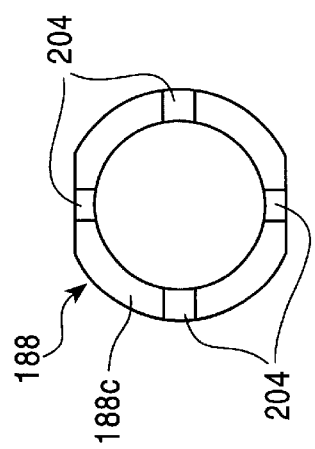
Figure 40A:
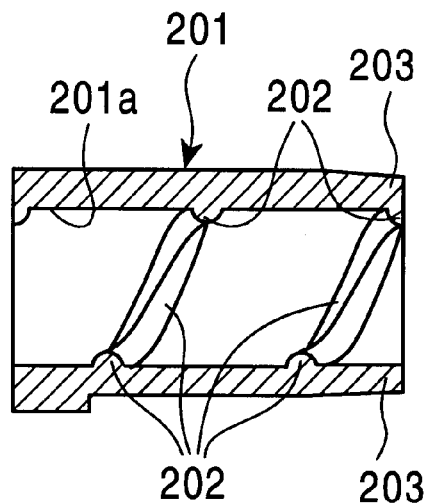
FIG. 40A is a sectional view and FIG. 40B is a front view each showing a backlash-eliminating nut.
Figure 40B:
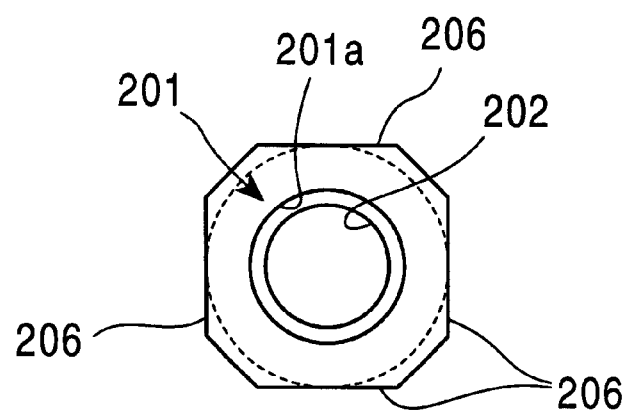

A mounting device 230 of the lead screw 178 will now be described with reference to FIGS. 36 to 38.

The thrust bearings 181, 182 for rotatably supporting the both front and rear ends 178a, 178b of the lead screw 178 are formed of wear-resistant synthetic resin, the front end side thrust bearing 181 is formed into substantially the shape of a cap, and the rear end side thrust bearing 182 is formed into the shape of a cylinder. The thrust bearings 181, 182 are mounted to a pair of bearing-mounting tabs 231, 232, respectively, that are integrally formed with the skew adjustment base 172. The both ends 178a, 178b are alternately inserted into the thrust bearings 181, 182, respectively, from the directions of the arrows $b_1$, $b_2$ to be rotatably supported thereby. The plate spring 183 is detachably secured by a set screw 234 on the lower surface of the lead screw 178 at its one side position on the rear end 172a of the screw adjustment base 172. However, a pair of positioning small pieces 235 formed by bending the plate spring 183 vertically upward at its both longitudinal ends are held in a pair of positioning small holes 236 formed in the screw adjustment base 172 so as to lock the plate spring 183.

An elastic arm 237 is integrally formed on the front edge side of the plate spring 183 in the direction substantially perpendicular to the lead screw 178, and the rear end 178b of the lead screw 178 is pressed in the direction of the arrow $b_2$, whereby the front end 178a of the lead screw 178 is elastically pressed to the inner bottom surface 181b of a shaft insertion hole 181a of the front end side thrust bearing 181. A low friction and wear-resistant synthetic resin sheet 238 formed of, for example a ultra-high-molecular-weight polyethylene adhesive tape, is bonded at the distal end 237a of the elastic arm 237 on an abutment surface of the lead screw 178. A stopper 239 integrally formed with the plate spring 183 is arranged with a clearance 240 on a position opposite to the rear end 178b of the lead screw 178 across the distal end 237a of the elastic arm 237.

In addition, dimensional setting is made so as to obtain the relations A≦B and A>C, when an engagement depth of the front end 178a of the lead screw 178 with the shaft insertion hole 181a of the front end side thrust bearing 181 is taken as A, a gap between the rear end side thrust bearing 182 and the follower gear 195 of the lead screw 178 is taken as B, and the width of the clearance 240 between the distal end 237a of the elastic arm 237 and the stopper 239 is taken as C.

Therefore, according to the mounting device 230 of the lead screw 178, the lead screw 178 can be stably actuated into rotation at all times with the front end 178a always pressed to the inner bottom surface 181b of the shaft insertion hole 181a by the elastic arm 237 from the direction of the arrow $b_2$.

Moreover, due to the above-described dimensional setting, when the lead screw 178 receives a thrust force in the direction of the arrow $b_1$ by the inertia generated when lead screw 178 is actuated into rotation at high speed in the forward and reverse directions to seek the head transfer base 185 at high speed in the directions of the arrows $b_1$, b2, the distal end 237a of the elastic arm 237 flexes in the direction of the arrow $b_1$. However, when the distal end 237a abuts with the stopper 239 from the direction of the arrow $b_1$ to be stopped, the front end 178a of the lead screw 178 is still in engagement with the shaft insertion hole 181a of the thrust bearing 181. Therefore, the front end 178a does not fall out of the shaft insertion hole 181a in the direction of the arrow $b_1$ even if the lead screw 178 is slid as far as possible in the direction of the arrow $b_1$. Therefore, the lead screw 178 does not fall out between the thrust bearings 181, 182 at all by the inertia of the head transfer base 185, thereby ensuring a high degree of reliability.

At the time of maintenance, examination, and repair, only the set screw 234 securing the plate spring 183 is unscrewed and the plate spring 183 is removed from the skew adjustment base 172, whereby the stopper 239 is also removed together with the plate spring 183. Thereafter, the lead screw 178 is slid in the direction of the arrow $b_1$ to draw the front end 178a out of the shaft insertion hole 181a in the direction of the arrow $b_1$. Then, the lead screw 178 can be easily removed from the screw adjustment base 172 in such a manner that the lead screw 178 is slid in the direction of the arrow $b_2$ and the rear end 178b is drawn out of the thrust bearing 182 in the direction of the arrow $b_2$. The lead screw 178 can be easily mounted to the skew adjustment base 172 by the reverse operation of removal operation.

(13) Thrust Bearing Device

Figure 45A:
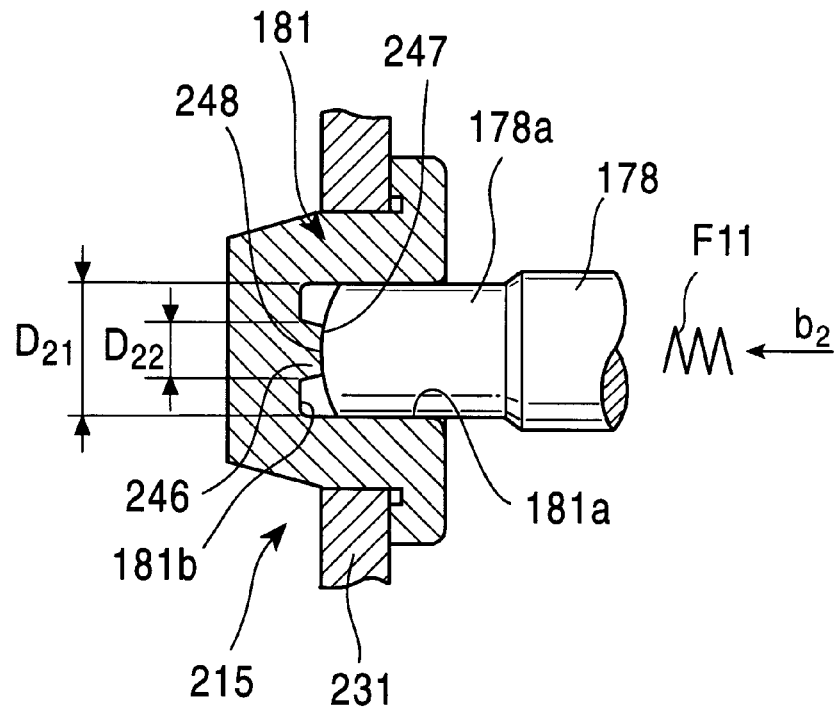
FIG. 45A is a sectional view and FIG. 45B is a front view each illustrating a thrust bearing device of the lead screw.
Figure 45B:
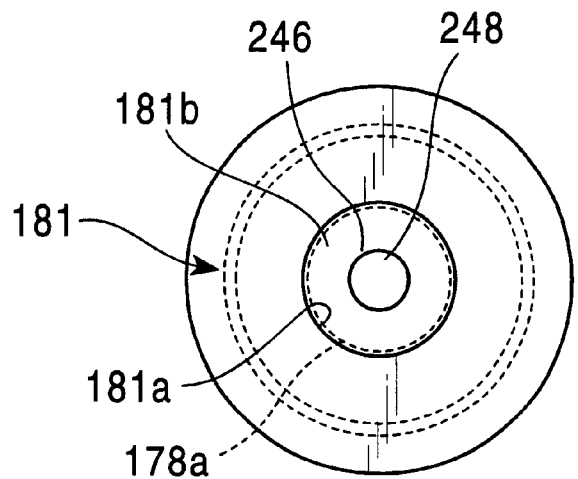

A thrust bearing device 245 will now be described with reference to FIGS. 45 and 46.

The lead screw 178 is formed of metal, such as stainless steel, and the thrust bearing 181 formed into substantially the shape of a cap is formed of wear-resistant synthetic resin. Therefore, mutual wear between the lead screw 178 and the thrust bearing 181 can be minimized, as compared with a case in which both of them are formed of metal or synthetic resin.

The inside diameter of the thrust bearing 181 is formed to be substantially equal to the diameter $D_{21}$ of the front end 178a of the lead screw 178, and a projection 246 having the diameter $D_{22}$ that is sufficiently smaller than the diameter $D_{21}$ of the front end 178a is coaxially integrally formed on the center of the inner bottom surface 181b of the shaft insertion hole 181a. A distal end surface of the front end 178a is formed into a spherical surface 247, and a distal end surface (a thrust receiving surface) of the projection 246 is formed into a flat surface 248. The front end 178a inserted into the thrust bearing 181a in the direction of the arrow $b_2$ is elastically pressed by a resilient force $F_{11}$ of the elastic arm 237 of the plate spring 183, so that the spherical surface 247 is in point-contact with the flat surface 248.

Figure 46:
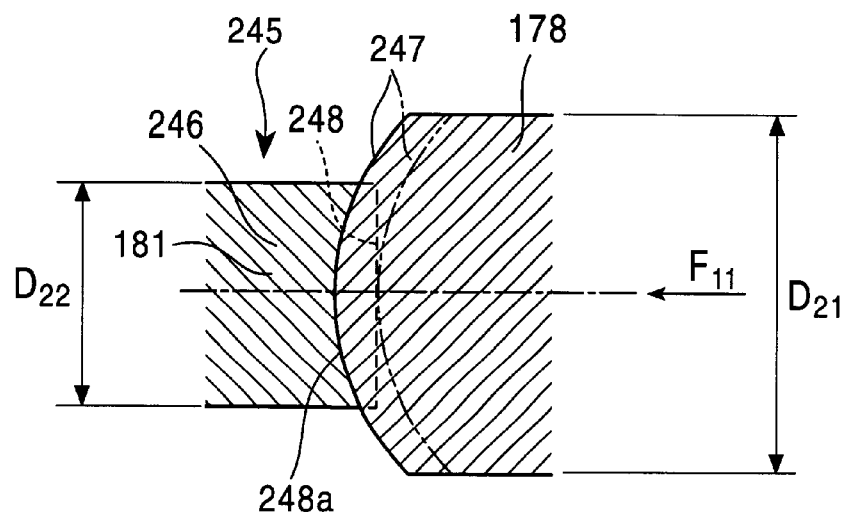
FIG. 46 is an enlarged sectional view of a main part of FIG. 45.

Therefore, as shown in FIG. 46, even if the flat surface 248 of the projection 246 is worn into a spherical surface 248a following the spherical surface 247 of the distal end surface of the lead screw 178 with the passage of time for rotating the lead screw 178 at high speed, the contact area between the lead screw 178 and the thrust bearing 181 with the progress of the wear falls within the range of the diameter $D_{22}$ of the projection 246, and the contact area is not expanded to the diameter $D_{21}$ of the front end 178a of the lead screw 178. As a result, even if the thrust receiving surface of the projection 246 is worn into the spherical surface 248a, there is little increase in the contact area between the front end 178a of the lead screw 178 and the thrust bearing 181, and a load torque of the rotation of the lead screw 178 can be ensured in a minimum state. Therefore, the thrust bearing device 245 best suited for actuating the lead screw 178 into high-speed rotation to seek the head transfer base 185 at high speed can be realized. In addition, since the load torque of the rotation of the lead screw 178 can be ensured in a minimum state, an improvement in a space factor due to a reduction in volume of the head transferring motor 192, miniaturization and weight reduction of the optical disc apparatus 10 can be achieved.

Figure 47:
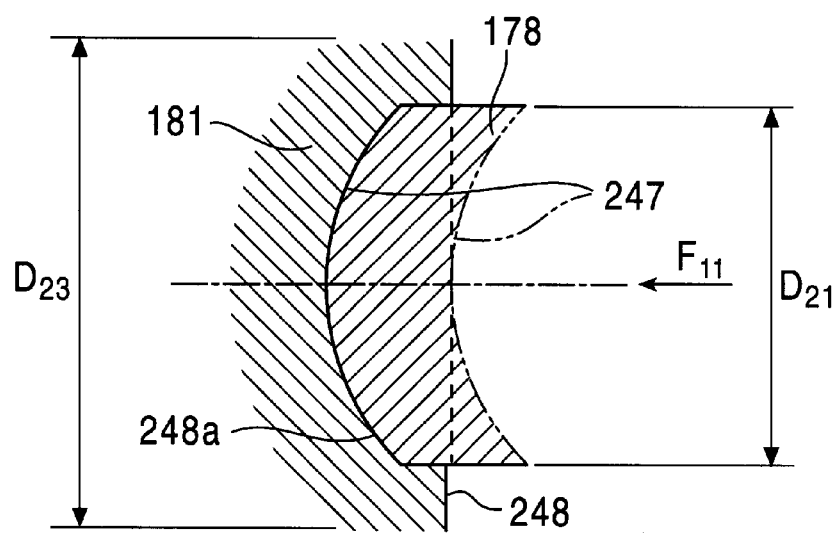
FIG. 47 is an enlarged sectional view of a main part of a general thrust bearing device.

In FIG. 47, the thrust receiving surface 248 is formed into a flat surface having the diameter $D_{23}$ larger than the diameter $D_{21}$ of the front end 178a thereby to thrust-receive the front end 178a. In this case, when the thrust receiving surface 248 is worn into a spherical surface 248a following the spherical surface 247 of the distal end surface of the lead screw 178, the contact area between the lead screw 178 and the thrust bearing 181 is increased to the range of the diameter $D_{21}$ of the lead screw 178 at the maximum, so that the load torque of the rotation of the lead screw 178 is considerably increased with the progress of wear. The construction of the thrust bearing device 245 shown in FIG. 46, however, does not cause such a considerable increase in the load torque of the rotation of the lead screw 178.

While the present invention has been described with respect to what is presently considered to be the preferred embodiments, it is to be understood that the invention is not limited to the disclosed embodiments. To the contrary, the invention is intended to cover various modifications and equivalent arrangements included within the sprit and scope of the appended claims. The scope of the following claims is to be accorded the broadest interpretation so as to encompass all such modifications and equivalent structures and functions.

What is claimed is:

1. A disc apparatus for loading a cartridge containing therein a disc-shaped recording medium, so that at least one of recording information on and reproducing information from said disc-shaped recording medium is performed, said apparatus comprising:

guide means into which said cartridge is inserted;
   cartridge retracting means for retracting said cartridge inserted into said guide means, wherein said cartridge retracting means includes a first motor;
   disc loading means for inserting a disc table into said cartridge retracted by said cartridge retracting means and loading said disc-shaped recording medium on said disc table, wherein said disc loading means includes a second motor;

first and second clutch means provided in the driving paths of said first and second motor, respectively;

operation means for switching both said first and second clutch means to a disengaged state; and ejection means for ejecting said cartridge out of said guide means when both said first and second clutch means are switched to said disengaged state.

2. The disc apparatus according to claim 1, wherein said operation means comprises a slide member being operable from outside of a front panel of said disc apparatus and being slidable in a direction of insertion of said cartridge into said guide means; and wherein said slide member has first and second operating portions for switching both said first and second clutch means, respectively, to said disengaged state.

3. The disc apparatus according to claim 2, wherein said first and second clutch means comprise, respectively:

first and second clutch gears arranged in gear trains and movable in axial directions, respectively;

first and second clutch springs for biasing said first and second clutch gears, respectively, from a disengaged to an engaged position; and first and second clutch cams operable by said first and second operating portions, respectively, for moving said first and second clutch gears against said first and second clutch springs from the engaged to the disengaged position.

4. A disc apparatus for loading a cartridge containing therein a disc-shaped recording medium, so that at least one of recording information on and reproducing information from said disc-shaped recording medium is performed, said apparatus comprising:

guide means into which said cartridge is inserted;

cartridge retracting means for retracting said cartridge inserted into said guide means to a retraction end position of said guide means;

a plurality of positioning pins for insertion into said guide means from below said guide means after said cartridge has been retracted to said retraction end position by said cartridge retracting means;

cartridge presser means for pressing said cartridge from above said guide means and for positioning said cartridge on said positioning pins after said cartridge has been retracted to said retraction end position by said cartridge retracting means; and a driving mechanism for moving said cartridge presser means up and down in directions parallel to said guide means.

5. The disc apparatus according to claim 4, wherein said driving mechanism comprises a slide plate slidably movable with respect to said guide means, and a pair of springs for elastically pressing said cartridge presser means onto said cartridge in response to movement of said slide plate; and wherein said pair of springs are respectively arranged on both sides of said guide means and oriented substantially parallel to a direction of insertion of said cartridge.

6. The disc apparatus according to claim 5, further comprising:

a deck having mounted thereon said positioning pins;

a disc table for loading said disc-shaped recording medium thereon;

a spindle motor for actuating said disc table; and loading means for loading said disc-shaped recording medium on said disc table by actuating said deck from a downward position to an upward position with respect to said guide means, and actuating said slide plate so that said cartridge presser means is moved up and down in directions parallel to said guide means by said driving mechanism.

* * * * *